United States Patent
Jin et al.

(10) Patent No.: US 10,931,905 B2
(45) Date of Patent: Feb. 23, 2021

(54) PIXEL ARRAY INCLUDED IN THREE-DIMENSIONAL IMAGE SENSOR AND METHOD OF OPERATING THREE-DIMENSIONAL IMAGE SENSOR

(71) Applicant: SAMSUNG ELECTRONICS CO., LTD., Suwon-si (KR)

(72) Inventors: Young-Gu Jin, Suwon-si (KR); Min-Sun Keel, Seoul (KR); Young-Chan Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 16/172,004

(22) Filed: Oct. 26, 2018

(65) Prior Publication Data
US 2019/0208150 A1  Jul. 4, 2019

(30) Foreign Application Priority Data
Dec. 29, 2017 (KR) .................. 10-2017-0184239

(51) Int. Cl.
| | |
|---|---|
| H04N 5/369 | (2011.01) |
| H04N 5/3745 | (2011.01) |
| H04N 5/351 | (2011.01) |
| G01S 17/89 | (2020.01) |
| G06T 7/521 | (2017.01) |

(52) U.S. Cl.
CPC ......... *H04N 5/36965* (2018.08); *G01S 17/89* (2013.01); *H04N 5/351* (2013.01); *H04N 5/3745* (2013.01); *G06T 7/521* (2017.01)

(58) Field of Classification Search
CPC .. H04N 5/36965; H04N 5/351; H04N 5/3745; G01S 17/89
See application file for complete search history.

(56) References Cited

U.S. PATENT DOCUMENTS

| | | |
|---|---|---|
| 6,351,844 B1 | 2/2002 | Bala |
| 8,767,189 B2 | 7/2014 | Mase et al. |
| (Continued) | | |

FOREIGN PATENT DOCUMENTS

| | | |
|---|---|---|
| JP | 2005-148509 | 5/2002 |
| JP | 2016-109932 | 6/2016 |

*Primary Examiner* — Sinh Tran
*Assistant Examiner* — Zhenzhen Wu
(74) *Attorney, Agent, or Firm* — F. Chau & Associates, LLC

(57) ABSTRACT

A pixel array in a three-dimensional image sensor includes depth pixels and an ambient light cancellation (ALC) circuit. The depth pixels operate in response to photo control signals having different phases, and generate distance information of an object based on light reflected by the object. The ALC circuit removes an ambient light component from the reflected light, and is shared by the depth pixels. Each depth pixel includes a photoelectric conversion region, a floating diffusion region, a photo gate, and a drain gate. The photoelectric conversion region collects photo charges based on the reflected light. The floating diffusion region accumulates the photo charges. The photo gate is activated in response to one of the photo control signals. The photoelectric conversion region accumulates the photo charges when the photo gate is activated, and the photo charges in the photoelectric conversion region are released when the drain gate is activated.

20 Claims, 30 Drawing Sheets

(56) References Cited

U.S. PATENT DOCUMENTS

| | | |
|---|---|---|
| 8,987,652 B2 | 3/2015 | Zheng |
| 9,129,548 B2 | 9/2015 | Zheng |
| 9,344,657 B2 | 5/2016 | Kim et al. |
| 2012/0281206 A1* | 11/2012 | Ko .................... H01L 27/14603 356/218 |
| 2013/0119438 A1* | 5/2013 | Kim .................. H01L 27/14609 257/225 |
| 2013/0258099 A1* | 10/2013 | Ovsiannikov ......... G01S 17/894 348/140 |
| 2014/0183338 A1* | 7/2014 | Fossum ................. G01S 17/894 250/208.1 |
| 2014/0225173 A1* | 8/2014 | Kim .................... H01L 27/1461 257/292 |
| 2014/0253905 A1* | 9/2014 | Kim ....................... G01C 15/06 356/5.01 |
| 2014/0267859 A1* | 9/2014 | Wang ................... H04N 5/3559 348/308 |
| 2016/0119522 A1 | 4/2016 | Choi et al. |
| 2017/0034464 A1 | 2/2017 | Dielacher et al. |
| 2017/0084251 A1 | 3/2017 | Zheng |
| 2017/0212225 A1 | 7/2017 | Sommer et al. |

* cited by examiner

FIG. 29

PIXEL ARRAY INCLUDED IN THREE-DIMENSIONAL IMAGE SENSOR AND METHOD OF OPERATING THREE-DIMENSIONAL IMAGE SENSOR

CROSS-REFERENCE TO RELATED APPLICATIONS

This application claims priority under 35 USC § 119 to Korean Patent Application No. 10-2017-0184239, filed on Dec. 29, 2017, the disclosure of which is incorporated by reference herein in its entirety.

Technical Field

Exemplary embodiments of the inventive concept relate generally to image sensors, and more particularly, to pixel arrays included in three-dimensional image sensors, and methods of operating three-dimensional image sensors.

Discussion of the Related Art

An image sensor is a semiconductor device configured to convert an externally incident optical signal into an electrical signal which can be used to derive image information corresponding to the optical signal. Recently, research has been directed towards the development of a three-dimensional image sensor which is capable of providing distance information as well as image information based on the optical signal. The three-dimensional image sensor may rely on distances between each of depth pixels and Time Of Flight (TOF) measurements to determine the distance of an object. TOF refers to a travel time of a laser pulse taken until the laser pulse returns to its origination through reflection after being irradiated onto the object.

SUMMARY

Exemplary embodiments of the present inventive concept provide a pixel array in a three-dimensional image sensor capable of efficiently reducing an ambient light component, and having a relatively small size.

Exemplary embodiments of the present inventive concept provide a method of operating a three-dimensional image sensor capable of having improved performance of measuring a distance of an object.

According to exemplary embodiments of the present inventive concept, a pixel array in a three-dimensional image sensor includes a first pixel group and a first ambient light cancellation circuit. The first pixel group includes a first group of a plurality of depth pixels that operates in response to a plurality of photo control signals having different phases, and generates first distance information of an object based on light reflected by the object. The first ambient light cancellation circuit removes an ambient light component from the light reflected by the object, and is shared by the first group of the plurality of depth pixels. Each depth pixel of the first group of the plurality of depth pixels includes a photoelectric conversion region, a floating diffusion region, a photo gate, and a drain gate. The photoelectric conversion region collects photo charges based on the light reflected by the object. The floating diffusion region is connected to the first ambient light cancellation circuit, and accumulates the photo charges. The photo gate is activated in response to one of the plurality of photo control signals. The drain gate is activated in response to one of a plurality of drain control signals. Each of the plurality of drain control signals has a phase opposite to that of a respective one of the plurality of photo control signals. The photoelectric conversion region accumulates the photo charges when the photo gate is activated, and the photo charges in the photoelectric conversion region are released when the drain gate is activated.

According to exemplary embodiments of the present inventive concept, a pixel array in a three-dimensional image sensor includes a first pixel group and a first ambient light cancellation circuit. The first pixel group includes a first group of a plurality of depth pixels that operates in response to a plurality of photo control signals having different phases, and generates first distance information of an object based on light reflected by the object. The first ambient light cancellation circuit removes an ambient light component from the light reflected by the object, and is shared by the first group of the plurality of depth pixels. Each of the first group of the plurality of depth pixels includes a photoelectric conversion region, first and second floating diffusion regions, and first and second photo gates. The photoelectric conversion region collects photo charges based on the light reflected by the object. The first and second floating diffusion regions are connected to the first ambient light cancellation circuit, and accumulate the photo charges. The first and second photo gates are activated in response to two photo control signals having opposite phases among the plurality of photo control signals. In a low illuminance mode in which illuminance of operating environment of the three-dimensional image sensor is lower than a reference illuminance, a first calculation in which distance information is generated for each depth pixel by obtaining phase information from neighboring depth pixels and by performing phase interpolation on the obtained phase information is selectively performed.

According to exemplary embodiments of the present inventive concept, a pixel array in a three-dimensional image sensor includes a first depth pixel and a first ambient light cancellation circuit. The first depth pixel operates in response to a plurality of photo control signals having different phases, generates first distance information of an object based on light reflected by the object, and includes a plurality of floating diffusion regions. The first ambient light cancellation circuit removes an ambient light component from the light reflected by the object, and is shared by the plurality of floating diffusion regions. The first depth pixel includes a photoelectric conversion region, first, second, third, and fourth floating diffusion regions, and first, second, third, and fourth photo gates. The photoelectric conversion region collects photo charges based on the light reflected by the object. The first, second, third, and fourth floating diffusion regions are connected to the first ambient light cancellation circuit, and accumulate the photo charges. The first, second, third, and fourth photo gates are activated in response to the plurality of photo control signals. The photoelectric conversion region accumulates the photo charges when the first, second, third, and fourth photo gates are activated.

According to exemplary embodiments of the present inventive concept, in a method of operating a three-dimensional image sensor, the three-dimensional image sensor includes a pixel array including a plurality of depth pixels configured to operate in response to a plurality of photo control signals having different phases. In the pixel array, a unit of distance information obtainment that is used for generating distance information of an object based on light reflected by the object is determined. The plurality of depth pixels is driven in response to the plurality of photo control signals by mapping one of the plurality of photo control signals to a respective one of the plurality of depth pixels based on a predetermined phase pattern. Distance information for each unit of the distance information obtainment is obtained by performing at least one of a first calculation in which phase interpolation is performed on phase information obtained from neighboring depth pixels, and a second calculation in which some of the plurality of depth pixels adjacent to each other are grouped and phase information obtained from the grouped depth pixels is used for obtaining each distance information.

According to exemplary embodiments of the present inventive concept, a pixel array included in a three-dimensional image sensor includes a first depth pixel, a second depth pixel, and an ambient light cancellation circuit. The first and second depth pixels are configured to operate in response to a plurality of photo control signals having different phases, and to generate distance information of an object based on a light reflected by the object. The ambient light cancellation circuit is configured to remove an ambient light component from the light reflected by the object. The ambient light cancellation circuit is shared by the first and second depth pixels. The first depth pixel includes a photoelectric conversion region configured to collect photo charges based on the light reflected by the object, and the second depth pixel includes a photoelectric conversion region configured to collect the photo charges based on the light reflected by the object. The photoelectric conversion region of the first depth pixel is not shared with the second depth pixel, and the photoelectric conversion region of the second depth pixel is not shared with the first depth pixel.

In the pixel array in the three-dimensional image sensor according to exemplary embodiments of the present inventive concept, the ambient light cancellation circuit is shared by the plurality of depth pixels having a 1-tap structure or a 2-tap structure, thereby efficiently removing the ambient light component, and reducing a size of the three-dimensional image sensor. In addition, in the method of operating the three-dimensional image sensor according to exemplary embodiments of the present inventive concept, the distance information is generated based on various operation modes and/or algorithms, thereby improving performance of the three-dimensional image sensor.

BRIEF DESCRIPTION OF THE DRAWINGS

The above and other features of the present inventive concept will become more apparent by describing in detail exemplary embodiments thereof with reference to the accompanying drawings, in which:

FIGS. 25, 26, 27, 28 and 29 are diagrams for describing a method of operating a three-dimensional image sensor according to exemplary embodiments of the inventive concept.

DETAILED DESCRIPTION OF THE EXEMPLARY EMBODIMENTS

Figure 1:
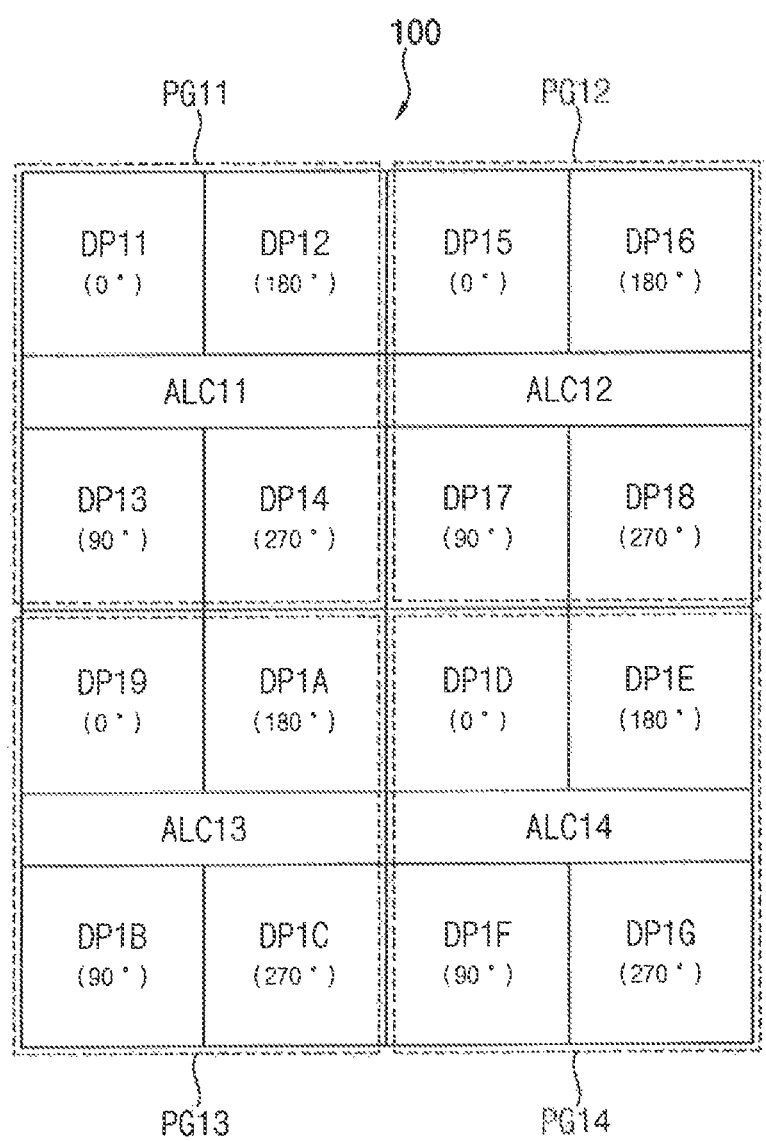
FIG. 1 is a plan view illustrating a pixel array in a three-dimensional image sensor according to exemplary embodiments of the inventive concept.

Exemplary embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art.

FIG. 1 is a plan view illustrating a pixel array in a three-dimensional image sensor according to exemplary embodiments of the inventive concept.

Referring to FIG. 1, a pixel array 100 included in a three-dimensional image sensor includes a plurality of pixel groups PG11, PG12, PG13 and PG14, and a plurality of ambient light cancellation (ALC) circuits ALC11, ALC12, ALC13 and ALC14.

The plurality of pixel groups PG11 to PG14 have the same structure or configuration, and includes a plurality of depth pixels DP11, DP12, DP13, DP14, DP15, DP16, DP17, DP18, DP19, DP1A, DP1B, DP1C, DP1D, DP1E, DP1F and DP1G. In an exemplary embodiment according to FIG. 1, one pixel group may include four depth pixels.

As will be described with reference to FIG. 30, the three-dimensional image sensor (e.g., a three-dimensional image sensor 1000 of FIG. 30) including the pixel array 100 emits transmission light (e.g., transmission light TX in FIG. 30), and an object (e.g., an object 1080 in FIG. 30) is illuminated with the transmission light. Depth pixels included in each pixel group operate in response to a plurality of photo control signals (e.g., a plurality of photo control signals PG1, PG2, PG3 and PG4 in FIG. 2) having different phases, generate distance information of an object based on light (e.g., light RX in FIG. 30) reflected by the object, and share a single ambient light cancellation circuit with each other.

In a plan view such as FIG. 1, a numerical value recorded in each depth pixel represents an example of a phase of a photo control signal applied to each depth pixel (e.g., a phase difference between the transmission light and the photo control signal applied to each depth pixel). In an exemplary embodiment according to FIG. 1, four depth pixels included in one pixel group may operate in response to four photo control signals having different phases, respectively.

The plurality of ambient light cancellation circuits ALC11 to ALC14 have the same structure or configuration, and remove an ambient light component from the light reflected by the object. Each of the plurality of ambient light cancellation circuits ALC11 to ALC14 is shared by depth pixels included in one pixel group. For example, the first ambient light cancellation circuit ALC11 may be shared by the depth pixels DP11 to DP14 included in the first pixel group PG11.

Although FIG. 1 illustrates an example in which the pixel array 100 includes four pixel groups PG11 to PG14 and four ambient light cancellation circuits ALC11 to ALC14, exemplary embodiments of the inventive concept are not limited thereto. For example, a pixel array according to exemplary embodiments may include M*N pixel groups arranged in a M*N matrix formation (e.g., M pixel groups are arranged in a first direction D1, and N pixel groups are arranged in a second direction D2 crossing (e.g., perpendicular to) the first direction D1) and ambient light cancellation circuits (e.g., M*N ambient light cancellation circuits) each of which corresponds to a respective one of the M*N pixel groups, in which each of M and N is a natural number greater than two.

Figure 2:
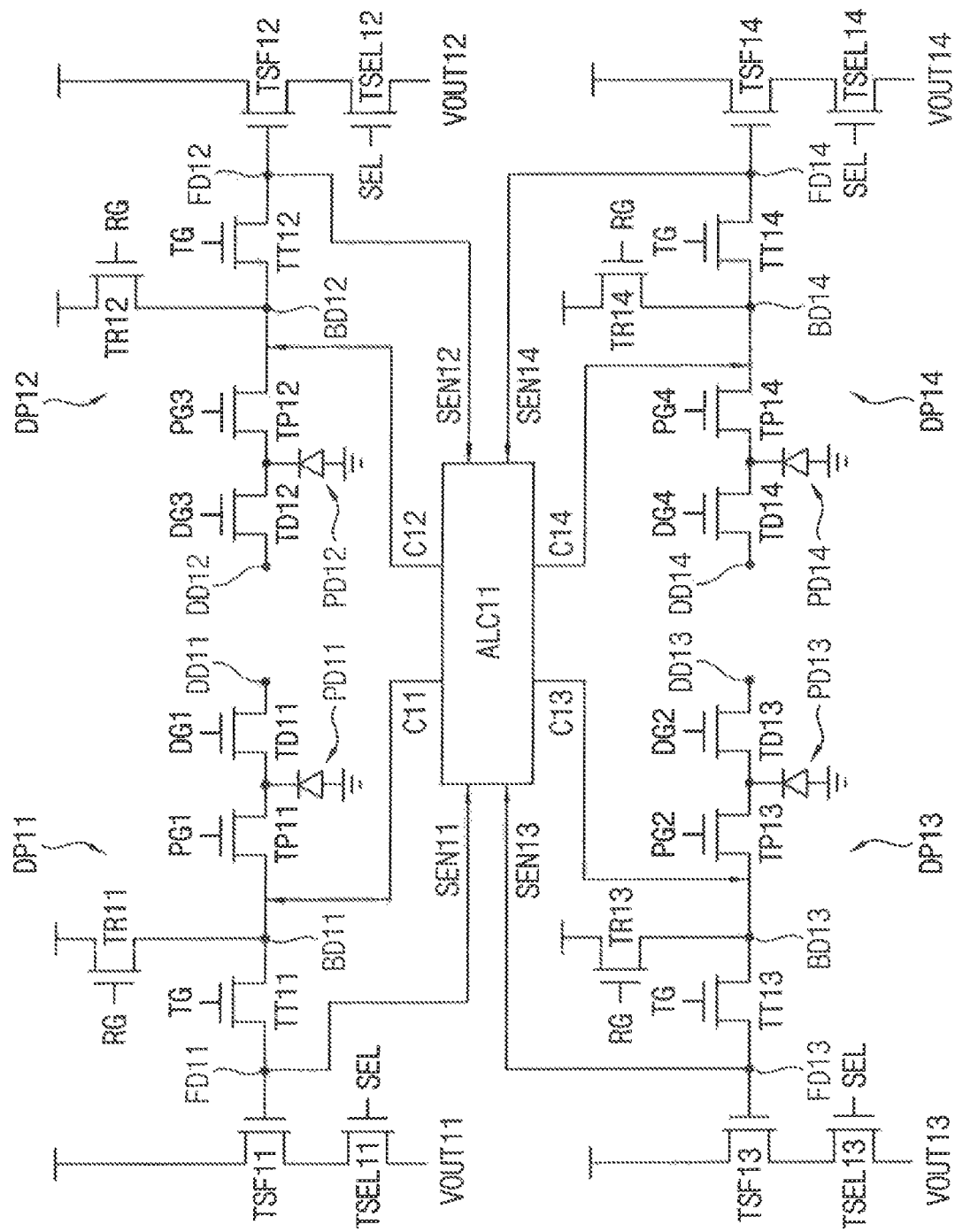
FIG. 2 is a circuit diagram illustrating an example of a first pixel group and a first ambient light cancellation circuit that are included in the pixel array of FIG. 1 according to exemplary embodiments of the inventive concept.
Figure 3:
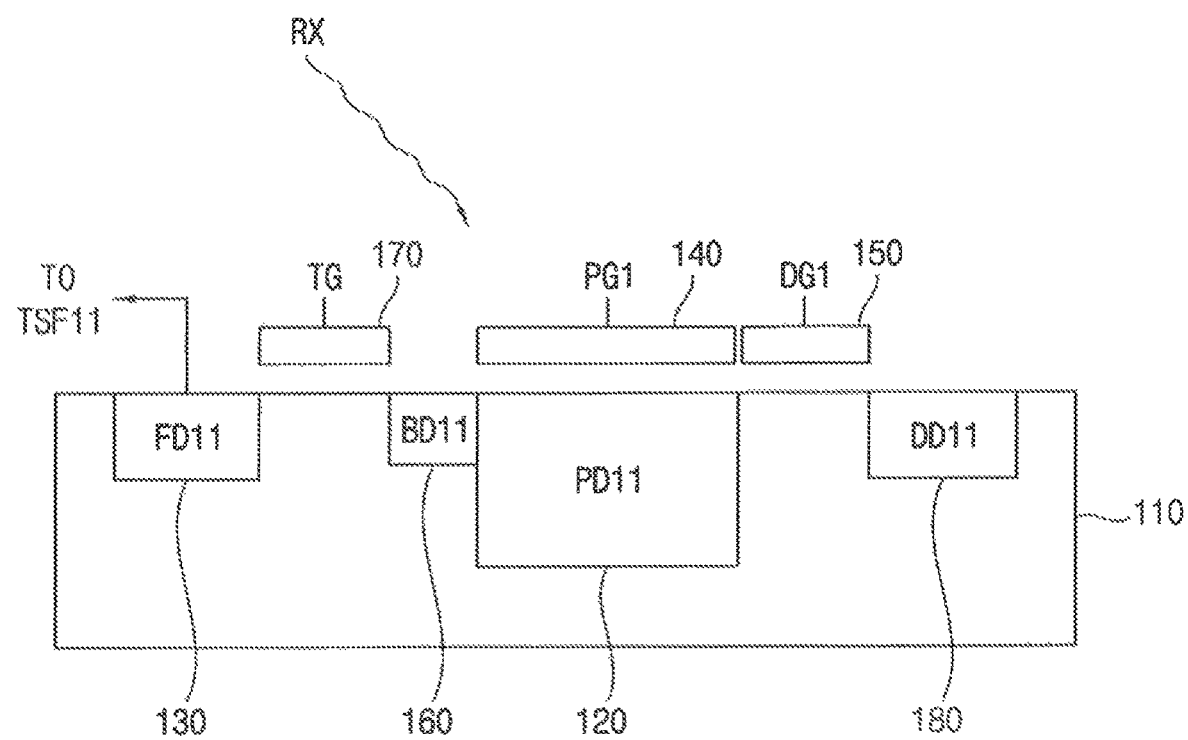
FIG. 3 is a cross-sectional view illustrating an example of a first depth pixel that is included in the first pixel group of FIG. 2 according to exemplary embodiments of the inventive concept.

FIG. 2 is a circuit diagram illustrating an example of a first pixel group and a first ambient light cancellation circuit that are included in the pixel array of FIG. 1 according to exemplary embodiments of the inventive concept. FIG. 3 is a cross-sectional view illustrating an example of a first depth pixel that is included in the first pixel group of FIG. 2 according to exemplary embodiments of the inventive concept.

Referring to FIGS. 1, 2 and 3, the depth pixels DP11 to DP14 that are included in the first pixel group PG11 and share the first ambient light cancellation circuit ALC11 may be implemented with a 1-tap (or a single-tap) structure. The 1-tap structure represents a structure of a depth pixel in which one floating diffusion region is used by one photoelectric conversion region.

For example, the first depth pixel DP11 includes a first photoelectric conversion region 120, a first floating diffusion region 130, a first photo gate 140 and a first drain gate 150. The first depth pixel DP11 may further include a first bridge diffusion region 160, a first transfer gate 170, a first drain region 180, a first reset transistor TR11, a first driving transistor (or a first source follower transistor) TSF11 and a first selection transistor TSEL11.

The first photo gate 140, the first drain gate 150 and the first transfer gate 170 are formed over a semiconductor substrate 110. The first photoelectric conversion region 120, the first floating diffusion region 130, the first bridge diffusion region 160 and the first drain region 180 are formed in the semiconductor substrate 110. In FIG. 2, elements corresponding to the first photo gate 140, the first drain gate 150, and the first transfer gate 170 are illustrated as a first photo transistor TP11, a first drain transistor TD11, and a first transfer transistor TT11, respectively. In FIG. 2, an element corresponding to the first photoelectric conversion region 120 is illustrated as a first photo diode PD11. In FIG. 2, elements corresponding to the first floating diffusion region 130, the first bridge diffusion region 160, and the first drain region 180 are illustrated as a first floating diffusion node FD11, a first bridge diffusion node BD11, and a first drain node DD11, respectively.

The first photo gate 140 is disposed over the first photoelectric conversion region 120, and is activated (e.g., turned on/off) in response to a first photo control signal PG1. The first photoelectric conversion region 120 collects, accumulates, or generates photo charges based on the light reflected by the object when the first photo gate 140 is activated or turned on. The first bridge diffusion region 160 is formed adjacent to the first photoelectric conversion region 120, and temporarily stores the photo charges collected, accumulated, or generated by the first photoelectric conversion region 120.

The first drain gate 150 is disposed between the first photoelectric conversion region 120 and the first drain region 180, and is activated (e.g., turned on/off) in response to a first drain control signal DG1 having a phase opposite to that of the first photo control signal PG1. The first drain region 180 is spaced apart from the first photoelectric conversion region 120, and the photo charges in the first photoelectric conversion region 120 are released, emitted, or drained to the first drain region 180 when the first drain gate 150 is activated or turned on.

The first transfer gate 170 is disposed between the first photoelectric conversion region 120 (or the first bridge diffusion region 160) and the first floating diffusion region 130, and is activated (e.g., turned on/off) in response to a transfer control signal TG. The first floating diffusion region 130 is spaced apart from the first photoelectric conversion region 120 (or the first bridge diffusion region 160), and accumulates the photo charges collected, accumulated, or generated by the first photoelectric conversion region 120 when the first transfer gate 170 is activated or turned on.

The first reset transistor TR11 resets or initializes the first floating diffusion region 130 (or the first bridge diffusion region 160) in response to a reset signal RG. The first driving transistor TSF11 amplifies a voltage at the first floating diffusion region 130. The first selection transistor TSEL11 provides the voltage amplified by the first driving transistor TSF11 as a first output voltage VOUT11 in response to a selection signal SEL.

In exemplary embodiments, the first depth pixel DP11 may be formed by applying a CMOS process to the semiconductor substrate 110. For example, the regions 120, 130, 160 and 180 may be formed in the semiconductor substrate 110 by implanting ions onto a top surface of the semiconductor substrate 110, and the gates 140, 150 and 170 may be formed over the semiconductor substrate 110 through the deposition process or the etching process such that the gates 140, 150 and 170 are spaced apart from the semiconductor substrate 110. An insulating layer, such as, for example, an oxide layer, may be interposed between the top surface of the semiconductor substrate 110 and the gates 140, 150, and 170.

In exemplary embodiments, the regions 120, 130, 160 and 180 may be formed by doping impurities having a conductive type which is different from that of the semiconductor substrate 110. For example, when the semiconductor substrate 110 is a p-type semiconductor substrate, the regions 120, 130, 160 and 180 may be formed by doping n-type impurities. For example, the regions 120, 130, 160 and 180 may be formed by doping n-type impurities at a concentration which is higher than a concentration of impurities in the semiconductor substrate 110. In this example, the photo charges may be electrons of the electron-hole pairs. However, exemplary embodiments of the inventive concept are not limited thereto.

The first ambient light cancellation circuit ALC11 detects or senses the photo charges accumulated in the first floating diffusion region 130 based on a first sensing signal SEN11, and provides a first compensation signal C11 to the first floating diffusion region 130 (or the first bridge diffusion region 160) when the amount of the photo charges accumulated in the first floating diffusion region 130 exceeds a predetermined reference value. For example, the first ambient light cancellation circuit ALC11 may remove the ambient light component from the light reflected by the object by injecting charges (e.g., holes) having a polarity opposite to that of the photo charges (e.g., electrons) into the first floating diffusion region 130 (or the first bridge diffusion region 160), or by releasing or draining the photo charges from the first floating diffusion region 130 (or the first bridge diffusion region 160).

A structure of each of the second, third and fourth depth pixels DP12, DP13 and DP14 may be substantially the same as a structure of the first depth pixel DP11. For example, the second depth pixel DP12 includes elements PD12, FD12, TP12, and TD12 corresponding to a second photoelectric conversion region, a second floating diffusion region, a second photo gate, and a second drain gate, respectively. The second depth pixel DP12 further includes other elements BD12, TT12, DD12, TR12, TSF12, and TSEL12, operates in response to a third photo control signal PG3 and a third drain control signal DG3, and provides a second output voltage VOUT12. Similarly, the third depth pixel DP13 includes elements PD13, FD13, TP13, TD13, BD13, TT13, DD13, TR13, TSF13, and TSEL13, operates in response to a second photo control signal PG2 and a second drain control signal DG2, and provides a third output voltage VOUT13. Similarly, the fourth depth pixel DP14 includes elements PD14, FD14, TP14, TD14, BD14, TT14, DD14, TR14, TSF14, and TSEL14, operates in response to a fourth photo control signal PG4 and a fourth drain control signal DG4, and provides a fourth output voltage VOUT14.

The first ambient light cancellation circuit ALC11 detects or senses photo charges accumulated in a floating diffusion region in the second, third and fourth depth pixels DP12, DP13 and DP14 based on second, third and fourth sensing signals SEN12, SEN13 and SEN14, respectively, and provides second, third and fourth compensation signals C12, C13 and C14 to the floating diffusion region (or a bridge diffusion region) in the second, third and fourth depth pixels DP12, DP13 and DP14, respectively, when the amount of the photo charges accumulated in the floating diffusion region exceeds the predetermined reference value.

The first and third output voltages VOUT11 and VOUT13 may share one output signal line, and the second and fourth output voltages VOUT12 and VOUT14 may share another output signal line.

According to exemplary embodiments of the inventive concept, each depth pixel includes its own dedicated photoelectric conversion region, which is not shared with other depth pixels. For example, referring to FIGS. 1, 2 and 3, in an exemplary embodiment, the first depth pixel DP11 includes its own photoelectric conversion region 120 (e.g., which corresponds to the first photo diode PD11), the second depth pixel DP12 includes its own photoelectric conversion region (e.g., a region corresponding to the second photo diode PD12), the third depth pixel DP13 includes its own photoelectric conversion region (e.g., a region corresponding to the third photo diode PD13), and the fourth depth pixel DP14 includes its own photoelectric conversion region (e.g., a region corresponding to the fourth photo diode PD14). The photoelectric conversion region 120 of the first depth pixel DP11 is not shared with any of the second, third and fourth depth pixels DP12, DP13 and DP14. The photoelectric conversion region of the second depth pixel DP12 is not shared with any of the first, third and fourth depth pixels DP11, DP13 and DP14. The photoelectric conversion region of the third depth pixel DP13 is not shared with any of the first, second and fourth depth pixels DP11, DP12 and DP14. The photoelectric conversion region of the fourth depth pixel DP14 is not shared with any of the first, second and third depth pixels DP11, DP12 and DP13.

Referring to a comparative example of a three-dimensional image sensor, an ambient light cancellation circuit may be shared by two or more depth pixels that share a photoelectric conversion region. However, in the comparative example, difficulty arises when attempting to share the ambient light cancellation circuit with two or more depth pixels that each includes its own photoelectric conversion region. In contrast, according to exemplary embodiments of the inventive concept, in a pixel array included in a three-dimensional image sensor, an ambient light cancellation circuit is shared by a plurality of depth pixels having a 1-tap or a 2-tap structure in which each depth pixel includes its own photoelectric conversion region that is not shared with other depth pixels. As a result, an ambient light component may be more efficiently removed, and the size of the three-dimensional image sensor may be reduced.

In addition, according to exemplary embodiments of the inventive concept, an ambient light cancellation circuit may be shared by a plurality of floating diffusion regions included in a depth pixel having a 4-tap structure, as described below with reference to FIGS. 22 and 23.

Figure 4:
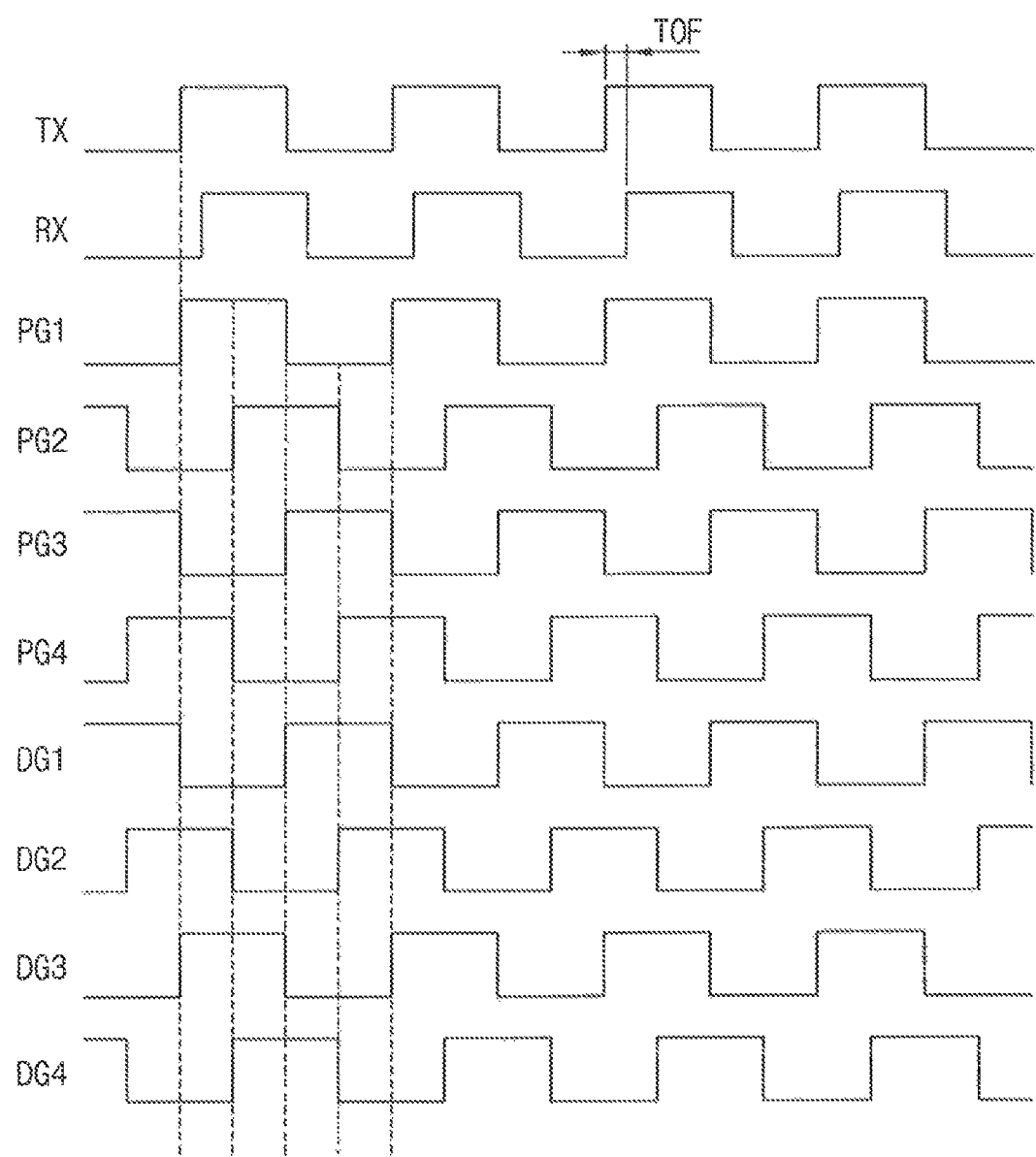
FIG. 4 is a timing diagram illustrating an example of photo control signals that are applied to a pixel array according to exemplary embodiments of the inventive concept.

FIG. 4 is a timing diagram illustrating an example of photo control signals that are applied to a pixel array according to exemplary embodiments of the inventive concept.

Referring to FIGS. 2, 3 and 4, the three-dimensional image sensor including the pixel array according to exemplary embodiments illuminates the modulated transmission light TX to the object (e.g., the object 1080 in FIG. 30) during an integration interval (or a light collection interval). The transmission light TX is reflected from the object and reaches the three-dimensional image sensor as the received light RX. The received light RX is delayed with respect to the transmission light TX by a TOF (Time Of Flight).

During the integration interval, the photo charges are collected or generated from each photoelectric conversion region (e.g., the first photoelectric conversion region 120) by the received light RX. For example, as illustrated in FIG. 4, each of the photo control signals PG1 to PG4 has the periodically variable intensity during the integration interval, and photo charges corresponding to an activation duration of each of the photo control signals PG1 to PG4 are generated from each photoelectric conversion region and collected as the photo charges. In this manner, the TOF can be calculated based on the quantity of the photo charges corresponding to the phase of the photo control signals PG1 to PG4.

During the integration interval, the photo control signals PG1 to PG4 may have different phases. For example, the first photo control signal PG1 may have a phase substantially the same as that of the transmission light TX, and a phase difference between the first photo control signal PG1 and the transmission light TX may be about 0 degrees. A phase difference between the second photo control signal PG2 and the transmission light TX (or the first photo control signal PG1) may be about 90 degrees. A phase difference between the third photo control signal PG3 and the transmission light TX may be about 180 degrees, and a phase difference between the third photo control signal PG3 and the second photo control signal PG2 may be about 90 degrees. A phase difference between the fourth photo control signal PG4 and the transmission light TX may be about 270 degrees, and a phase difference between the fourth photo control signal PG4 and the third photo control signal PG3 may be about 90 degrees. During the integration interval, phases of the drain control signals DG1 to DG4 may be opposite to those of the photo control signals PG1 to PG4, respectively.

In addition, during the integration interval, the first ambient light cancellation circuit ALC11 detects or senses the ambient light component included in the received light RX, and selectively performs a compensation operation for removing or reducing the ambient light component.

During a readout interval subsequent to the integration interval, the output voltages VOUT11 to VOUT14 are generated by controlling the transfer control signal TG, the reset signal RG, the selection signal SEL, etc. A digital signal processing circuit (e.g., a digital signal processing circuit 1050 in FIG. 30) performs a calculation based on the output voltages VOUT11 to VOUT14 to obtain the distance information of the object. For example, as will be described later, the distance information may be generated based on a unit of distance information obtainment, and each distance information may be obtained for each unit of the distance information obtainment (e.g., by units of the distance information obtainment).

Figure 5:
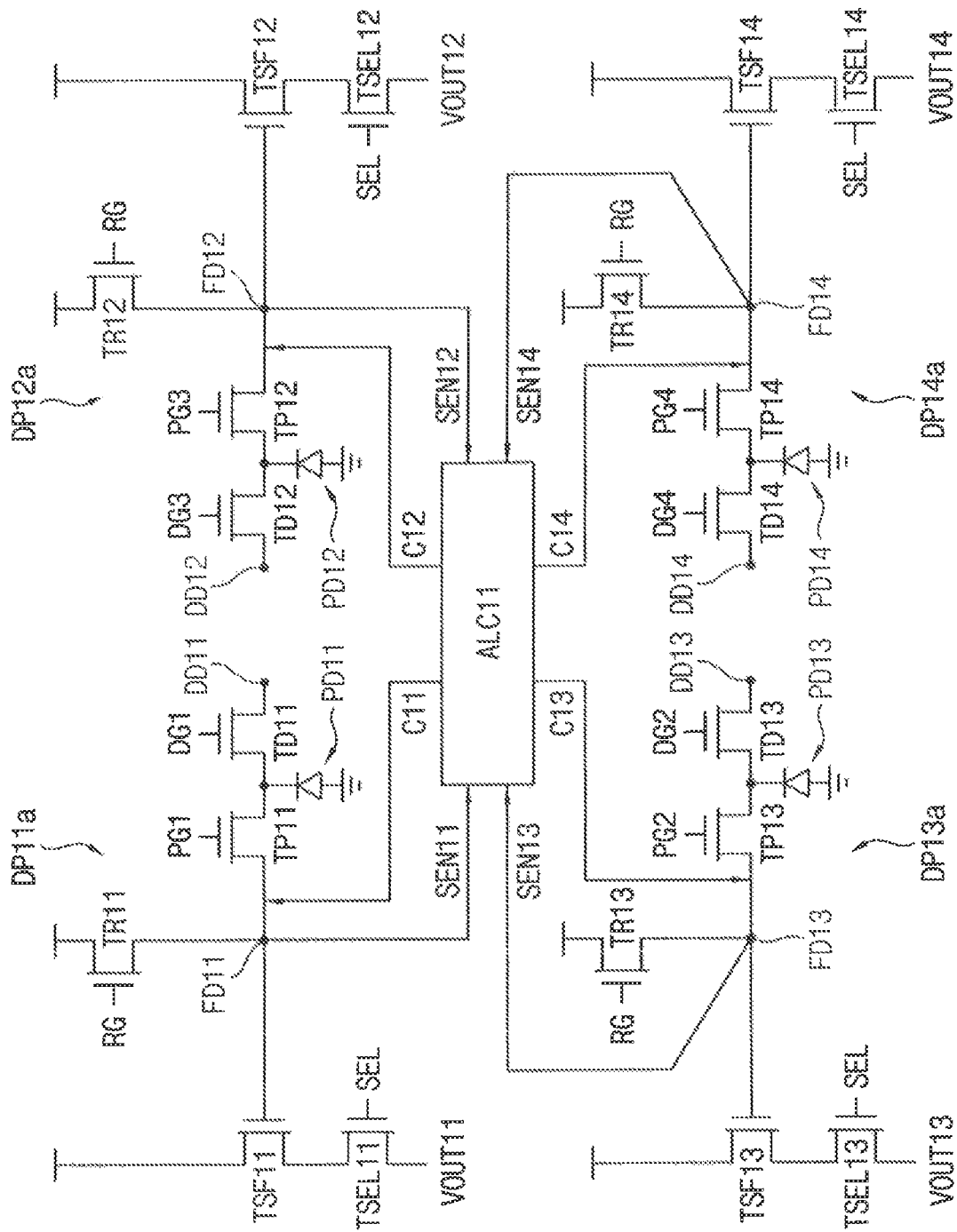
FIGS. 5 and 6 are circuit diagrams illustrating examples of a first pixel group and a first ambient light cancellation circuit that are included in the pixel array of FIG. 1 according to exemplary embodiments of the inventive concept.
Figure 6:
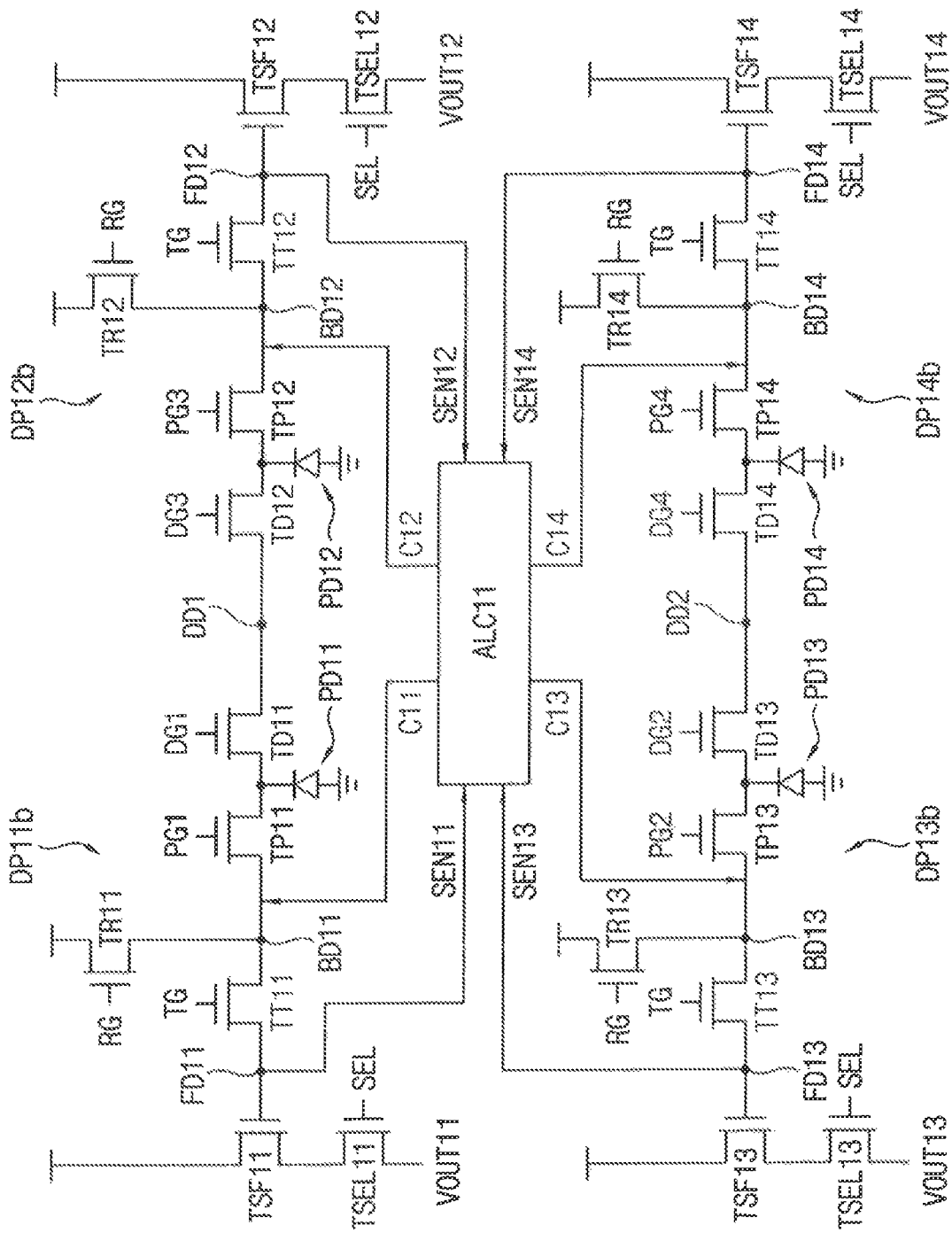

FIGS. 5 and 6 are circuit diagrams illustrating other examples of a first pixel group and a first ambient light cancellation circuit that are included in the pixel array of FIG. 1 according to exemplary embodiments of the inventive concept.

Referring to FIG. 5, depth pixels DP11a, DP12a, DP13a and DP14a may be substantially the same as the depth pixels DP11 to DP14 in FIG. 2, respectively, except that the transfer transistors TT11 to TT14 and the bridge diffusion nodes BD11 to BD14 are omitted in FIG. 5. For example, in the exemplary embodiment of FIG. 5, each of the depth pixels DP11a to DP14a does not include a transfer gate (e.g., the transfer gate 170 in FIG. 3) and a bridge diffusion region (e.g., the bridge diffusion region 160 in FIG. 3).

In each of the depth pixels DP11a to DP14a in FIG. 5, photo charges collected or generated from each photoelectric conversion region (e.g., the photoelectric conversion region 120 in FIG. 3) may be directly accumulated in each floating diffusion region (e.g., the floating diffusion region 130 in FIG. 3) or a respective one of the floating diffusion nodes FD11 to FD14 when each photo gate (e.g., the photo gate 140 in FIG. 3) or a respective one of the photo transistors TP11 to TP14 is activated or turned on. In addition, in an exemplary embodiment according to FIG. 5, each of the compensation signals C11 to C14 may be directly provided to each floating diffusion region or a respective one of the floating diffusion nodes FD11 to FD14.

Referring to FIG. 6, depth pixels DP11b, DP12b, DP13b and DP14b may be substantially the same as the depth pixels DP11 to DP14 in FIG. 2, respectively, except that in the exemplary embodiment of FIG. 6, a drain node DD1 is shared by DP11b and DP12b, and a drain node DD2 is shared by DP13b and DP14b. For example, in the exemplary embodiment of FIG. 6, two of the depth pixels DP11b to DP14b share one drain region (e.g., the drain region 180 in FIG. 3). In exemplary embodiments, one drain region may be shared by four depth pixels included in one pixel group.

Figure 7:
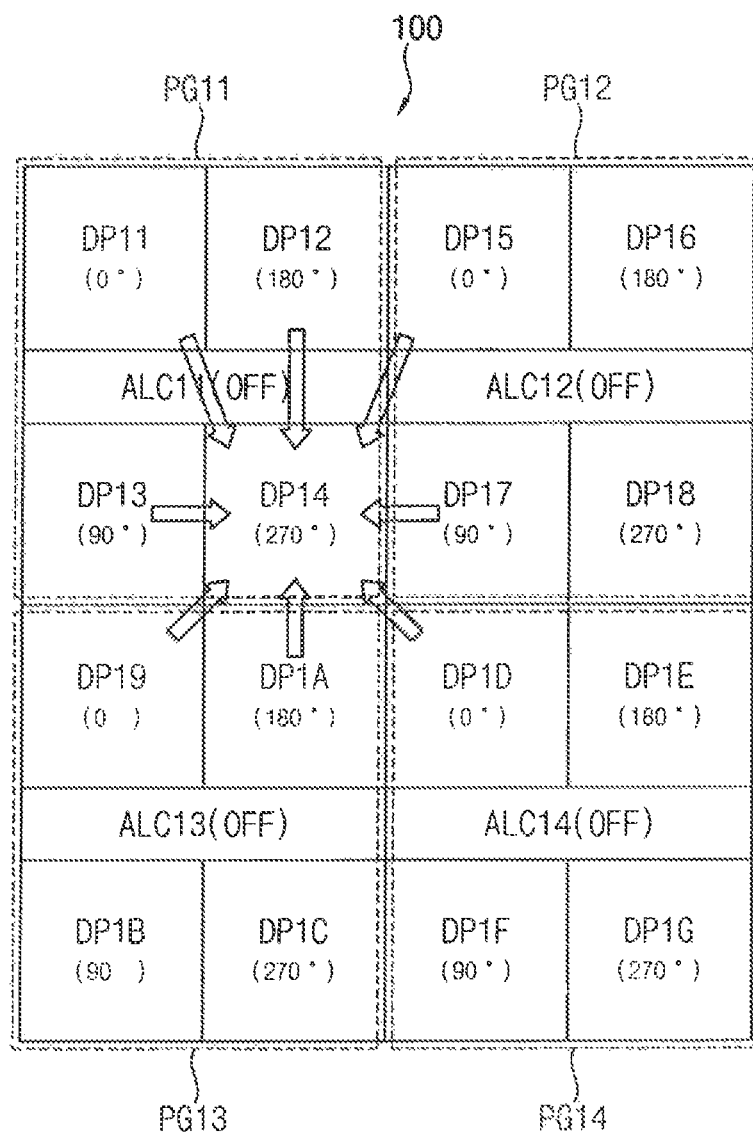
FIG. 7 is a diagram for describing a method of operating the pixel array of FIG. 1 according to exemplary embodiments of the inventive concept.

FIG. 7 is a diagram for describing a method of operating the pixel array of FIG. 1 according to exemplary embodiments of the inventive concept.

Referring to FIGS. 1, 4 and 7, in the pixel array 100, the phases of the photo control signals PG1 to PG4 may be fixed for all of integration intervals. For example, each of the photo control signals PG1 to PG4 may have the phase illustrated in FIG. 4 for all of integration intervals. For example, the first depth pixel DP11 may operate in response to the first photo control signal PG1 in which the phase difference between the first photo control signal PG1 and the transmission light TX is always about 0 degrees. Such an operation scheme may be referred to as a fixed phase pattern scheme.

In the pixel array 100 according to exemplary embodiments, four pieces of phase information (e.g., phase information of about 0 degrees, 90 degrees, 180 degrees and 270 degrees) may be required to generate one piece of distance information. A minimum unit for generating one piece of distance information (e.g., a unit of distance information obtainment) in the pixel array 100 may be determined according to an operation mode of the three-dimensional image sensor, and distance information may be generated by different schemes according to the operation mode of the three-dimensional image sensor.

In exemplary embodiments, the operation mode of the three-dimensional image sensor may be determined based on illuminance of the operating environment of the three-dimensional image sensor.

In exemplary embodiments, when the three-dimensional image sensor operates in a high illuminance mode (or an outdoor mode) in which the illuminance of the operating environment of the three-dimensional image sensor is greater than or about equal to a reference illuminance value, the pixel array 100 may operate as illustrated in FIG. 1. In this example, one pixel group (e.g., the pixel group PG11) including four depth pixels (e.g., the depth pixels DP11 to DP14) arranged in a 2*2 matrix formation may be determined as the unit of the distance information obtainment, distance information may be generated based on a 2*2 binning scheme in which a depth resolution is reduced by quarter (e.g., about ¼), and the ambient light cancellation circuits ALC11 to ALC14 may be activated or enabled to remove the ambient light component from the light reflected by the object.

For example, first phase information (e.g., phase information of about 0 degrees) based on the first photo control signal PG1 may be obtained from the depth pixel DP11, second phase information (e.g., phase information of about 90 degrees) based on the second photo control signal PG2 may be obtained from the depth pixel DP13, third phase information (e.g., phase information of about 180 degrees) based on the third photo control signal PG3 may be obtained from the depth pixel DP12, and fourth phase information (e.g., phase information of about 270 degrees) based on the fourth photo control signal PG4 may be obtained from the depth pixel DP14. One piece of distance information may be generated for the pixel group PG11 by performing a calculation on the first to fourth pieces of phase information. In this example, distance information may be obtained based on one depth frame (e.g., by sampling once).

In exemplary embodiments, when the three-dimensional image sensor operates in a low illuminance mode (or an indoor mode) in which the illuminance of the operating environment of the three-dimensional image sensor is less than the reference illuminance value, the pixel array 100 may operate as illustrated in FIG. 7. In this example, one depth pixel (e.g., the depth pixel DP14) may be determined as the unit of the distance information obtainment, distance information may be generated based on a full-depth resolution scheme, and the ambient light cancellation circuits ALC11 to ALC14 may be deactivated or disabled such that they do not perform the ambient light cancellation function.

For example, first phase information (e.g., phase information of about 0 degrees) based on the first photo control signal PG1 may be obtained from the first neighboring depth pixels DP11, DP15, DP19 and DP1D that are adjacent to the depth pixel DP14, second phase information (e.g., phase information of about 90 degrees) based on the second photo control signal PG2 may be obtained from the second neighboring depth pixels DP13 and DP17 that are adjacent to the depth pixel DP14, third phase information (e.g., phase information of about 180 degrees) based on the third photo control signal PG3 may be obtained from the third neighboring depth pixels DP12 and DP1A that are adjacent to the depth pixel DP14, and fourth phase information (e.g., phase information of about 270 degrees) based on the fourth photo control signal PG4 may be obtained from the depth pixel DP14 by itself. One piece of distance information may be generated for the depth pixel DP14 by performing phase interpolation on the first to fourth phase information.

As described above, to generate one piece of distance information for one pixel group (e.g., the pixel group PG11) in the high illuminance mode in the fixed phase pattern scheme, the phase information may be obtained from all of the depth pixels (e.g., the depth pixels DP11 to DP14) in one pixel group. In addition, to generate one piece of distance information for one depth pixel (e.g., the depth pixel DP14) in the low illuminance mode in the fixed phase pattern scheme, the phase information may be obtained from all of the remainder depth pixels (e.g., the depth pixels DP11, DP12 and DP13) included in the same pixel group (e.g., the pixel group PG11) and other neighboring depth pixels (e.g., the depth pixels DP15, DP17, DP19, DP1A and DP1D), as illustrated in FIG. 7.

Figure 8:
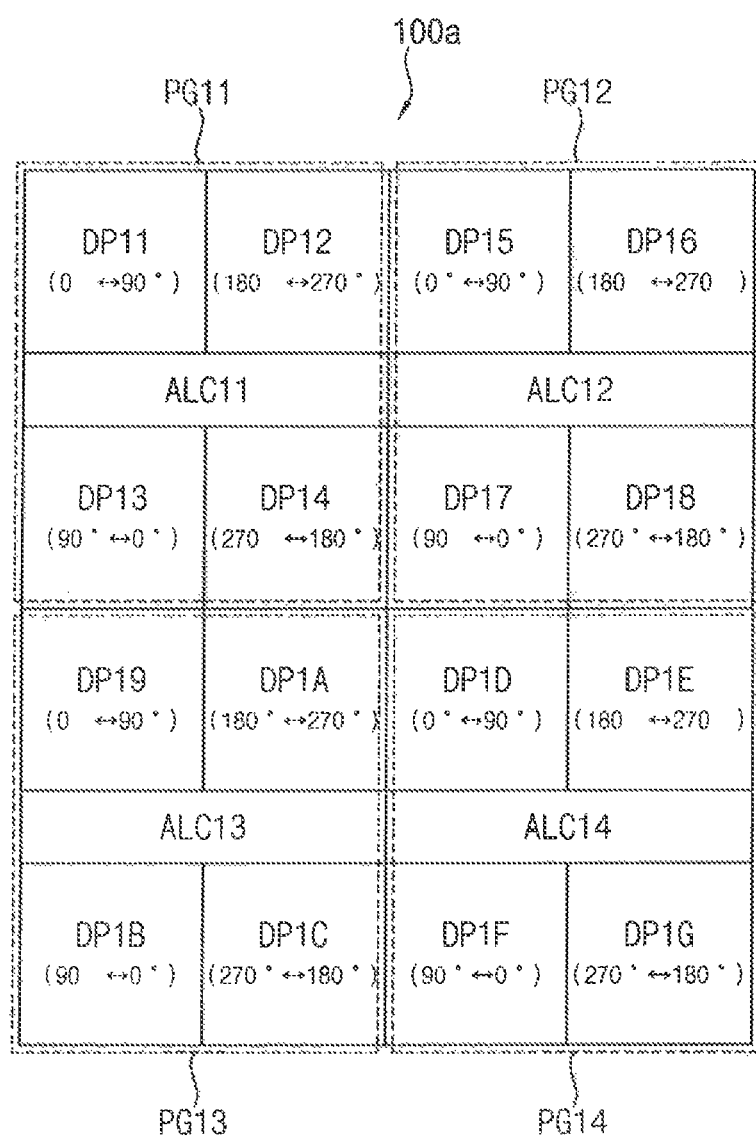
FIG. 8 is a plan view illustrating a pixel array in a three-dimensional image sensor according to exemplary embodiments of the inventive concept.

FIG. 8 is a plan view illustrating a pixel array in a three-dimensional image sensor according to exemplary embodiments of the inventive concept.

Referring to FIG. 8, a pixel array 100*a* of FIG. 8 may be substantially the same as the pixel array 100 of FIG. 1, except that the phases of the photo control signals PG1 to PG4 that are applied to the depth pixels DP11 to DP1G are variable in FIG. 8.

Figure 9:
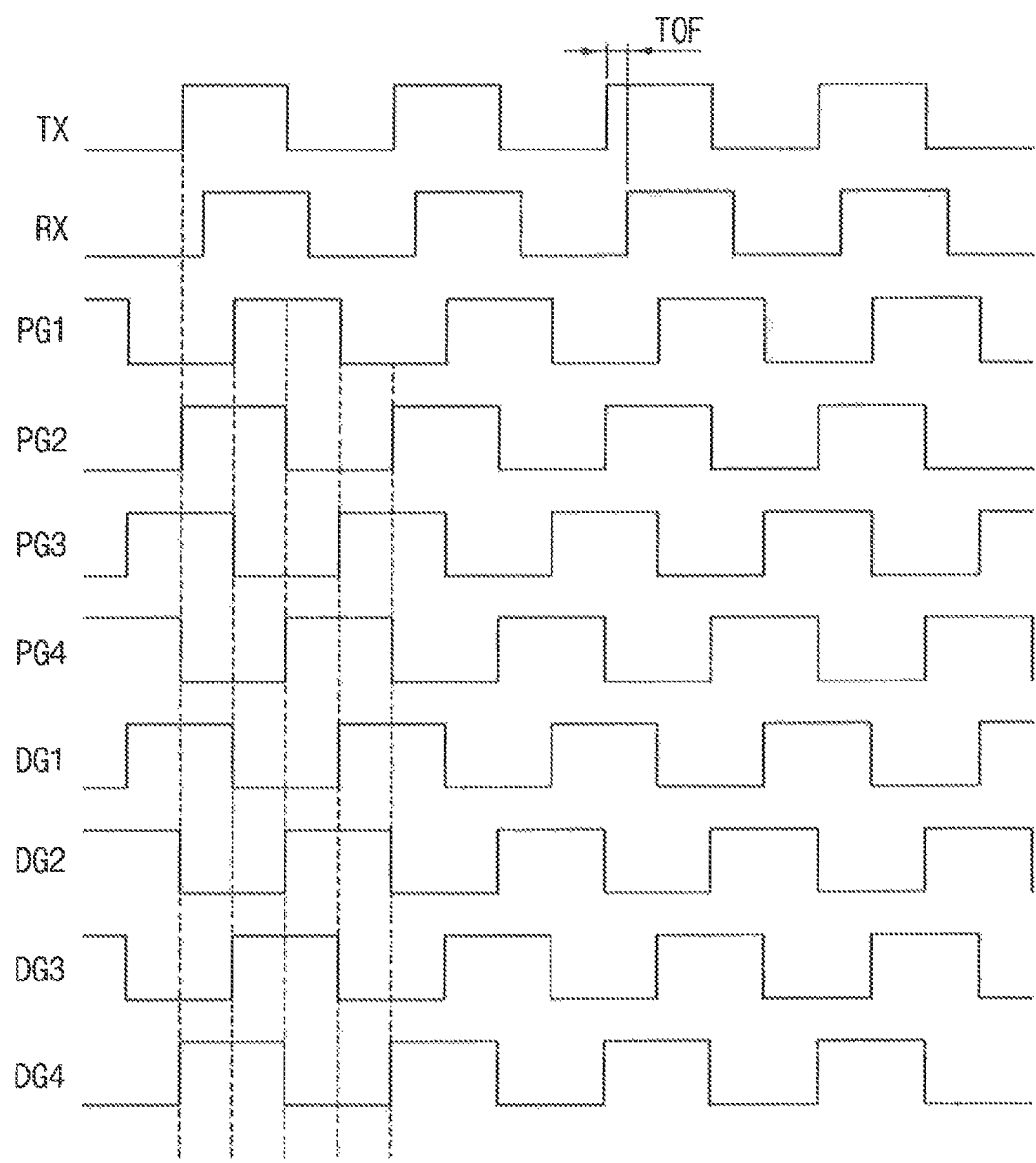
FIG. 9 is a timing diagram illustrating an example of photo control signals that are applied to a pixel array according to exemplary embodiments of the inventive concept.
Figure 10:
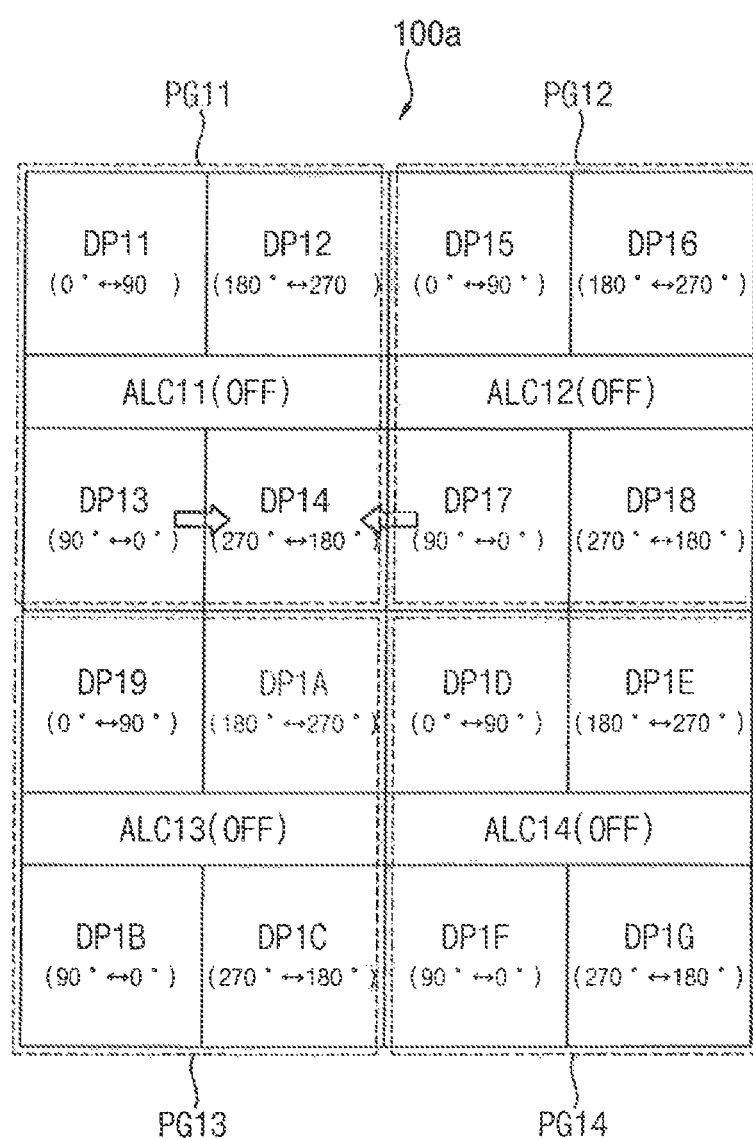
FIG. 10 is a diagram for describing a method of operating the pixel array of FIG. 8 according to exemplary embodiments of the inventive concept.

FIG. 9 is a timing diagram illustrating an example of photo control signals that are applied to a pixel array according to exemplary embodiments of the inventive concept. FIG. 10 is a diagram for describing a method of operating the pixel array of FIG. 8 according to exemplary embodiments of the inventive concept.

Referring to FIGS. 4, 8, 9 and 10, in the pixel array 100*a*, the phases of the photo control signals PG1 to PG4 may be variable for two consecutive integration intervals. For example, each of the photo control signals PG1 to PG4 may have the phase illustrated in FIG. 4 for a first integration interval, and may have a phase illustrated in FIG. 9 for a second integration interval subsequent to the first integration interval. For example, the first depth pixel DP11 may operate in response to the first photo control signal PG1 during the first integration interval in which the phase difference between the first photo control signal PG1 and the transmission light TX is about 0 degrees during the first integration interval, and may operate in response to the first photo control signal PG1 during the second integration interval in which a phase difference between the first photo control signal PG1 and the transmission light TX is about 90 degrees during the second integration interval. Such an operation scheme may be referred to as a variable phase pattern scheme.

As illustrated in FIG. 9, during the second integration interval subsequent to the first integration interval, the phase difference between the first photo control signal PG1 and the transmission light TX is about 90 degrees, a phase difference between the second photo control signal PG2 and the transmission light TX may be about 0 degrees, a phase difference between the third photo control signal PG3 and the transmission light TX may be about 270 degrees, and a phase difference between the fourth photo control signal PG4 and the transmission light TX may be about 180 degrees. During the second integration interval, phases of the drain control signals DG1 to DG4 may be opposite to those of the photo control signals PG1 to PG4, respectively.

Similar to the example described with reference to FIGS. 1 and 7, a unit of distance information obtainment in the pixel array 100*a* may be determined according to an operation mode of the three-dimensional image sensor, and distance information may be generated by different schemes according to the operation mode of the three-dimensional image sensor. In addition, the operation mode of the three-dimensional image sensor may be determined based on an illuminance of the operating environment of the three-dimensional image sensor.

In exemplary embodiments, when the three-dimensional image sensor operates in the high illuminance mode, the pixel array 100*a* may operate as illustrated in FIG. 8. In this example, one sub pixel group including two depth pixels (e.g., the depth pixels DP11 and DP12) arranged in a 2*1 matrix formation may be determined as the unit of the distance information obtainment, distance information may be generated based on a 2*1 binning scheme in which a depth resolution is reduced by about half (e.g., about ½), and the ambient light cancellation circuits ALC11 to ALC14 may be activated. For example, first phase information (e.g., phase information of about 0 degrees) may be obtained from the depth pixel DP11 during the first integration interval, second phase information (e.g., phase information of about 90 degrees) may be obtained from the depth pixel DP11 during the second integration interval, third phase information (e.g., phase information of about 180 degrees) may be obtained from the depth pixel DP12 during the first integration interval, and fourth phase information (e.g., phase information of about 270 degrees) may be obtained from the depth pixel DP12 during the second integration interval. One piece of distance information may be generated for the sub pixel group including the depth pixels DP11 and DP12 by performing a calculation on the first to fourth pieces of phase information. In this example, distance information may be obtained based on two depth frames (e.g., by sampling twice).

In exemplary embodiments, when the three-dimensional image sensor operates in the low illuminance mode, the pixel array 100*a* may operate as illustrated in FIG. 10. In this example, one depth pixel (e.g., the depth pixel DP14) may be determined as the unit of the distance information obtainment, and the ambient light cancellation circuits ALC11 to ALC14 may be deactivated. For example, first phase information (e.g., phase information of about 0 degrees) may be obtained from the neighboring depth pixels DP13 and DP17 that are adjacent to the depth pixel DP14 during the second integration interval, second phase information (e.g., phase information of about 90 degrees) may be obtained from the second neighboring depth pixels DP13 and DP17 during the first integration interval, third phase information (e.g., phase information of about 180 degrees) may be obtained from the depth pixel DP14 by itself during the second integration interval, and fourth phase information (e.g., phase information of about 270 degrees) may be obtained from the depth pixel DP14 by itself during the first integration interval. One piece of distance information may be generated for the depth pixel DP14 by performing phase interpolation on the first to fourth pieces of phase information.

As described above, to generate one piece of distance information for one sub pixel group including two depth pixels (e.g., the depth pixels DP11 and DP12) in the high illuminance mode in the variable phase pattern scheme, the phase information may be obtained from some of the remainder depth pixels (e.g., the depth pixel DP13) in the same pixel group (e.g., the pixel group PG11). In addition, to generate one piece of distance information for one depth pixel (e.g., the depth pixel DP14) in the low illuminance mode in the variable phase pattern scheme, the phase information may be obtained from some of the remainder depth pixels (e.g., the depth pixel DP13) included in the same pixel group (e.g., the pixel group PG11) and another neighboring depth pixel (e.g., the depth pixel DP17), as illustrated in FIG. 10.

Figure 11:
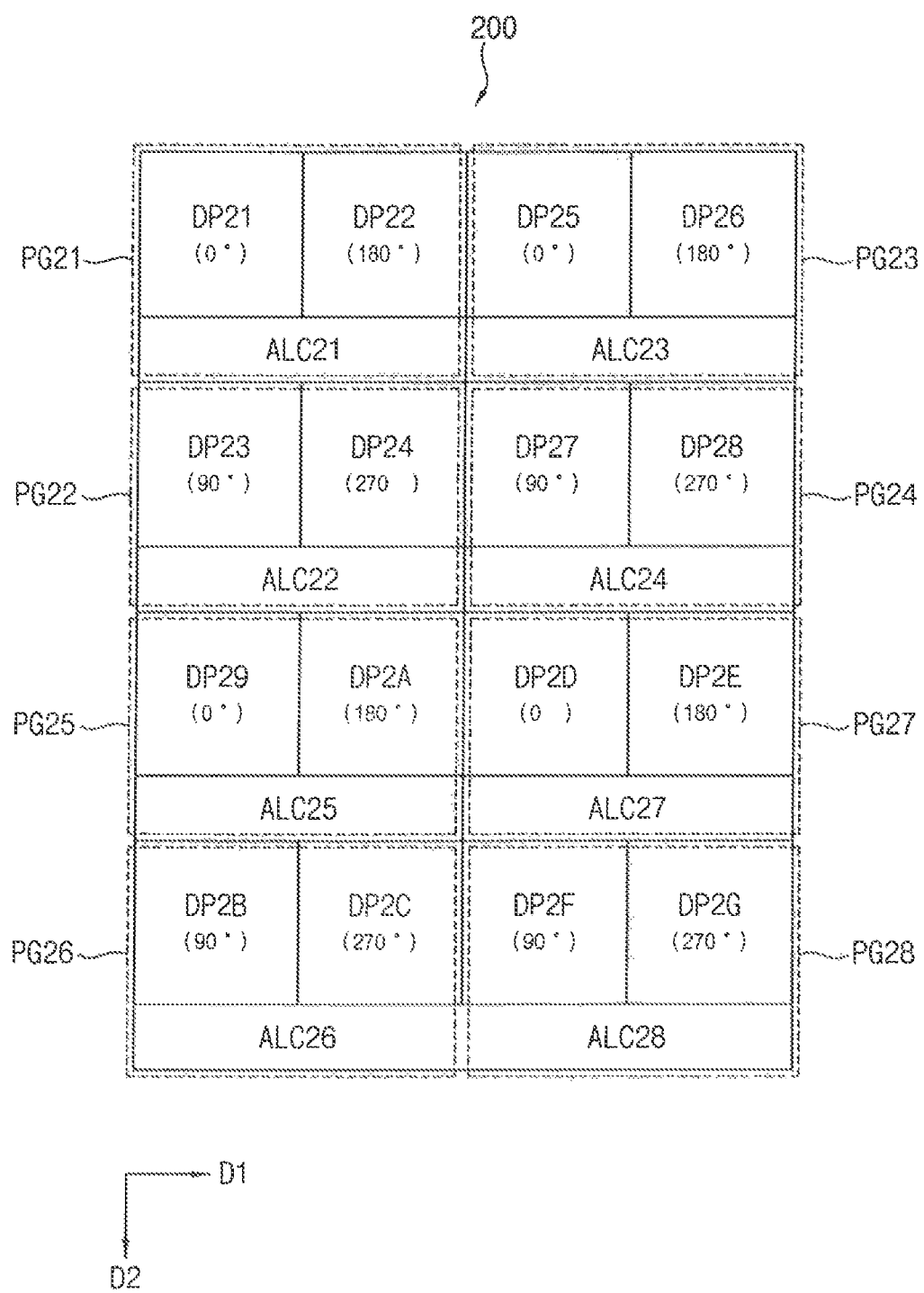
FIG. 11 is a plan view illustrating a pixel array in a three-dimensional image sensor according to exemplary embodiments of the inventive concept.

FIG. 11 is a plan view illustrating a pixel array in a three-dimensional image sensor according to exemplary embodiments of the inventive concept.

Referring to FIG. 11, a pixel array 200 included in a three-dimensional image sensor includes a plurality of pixel groups PG21, PG22, PG23, PG24, PG25, PG26, PG27 and PG28, and a plurality of ambient light cancellation circuits ALC21, ALC22, ALC23, ALC24, ALC25, ALC26, ALC27 and ALC28.

The plurality of pixel groups PG21 to PG28 have the same structure or configuration, and includes a plurality of depth pixels DP21, DP22, DP23, DP24, DP25, DP26, DP27, DP28, DP29, DP2A, DP2B, DP2C, DP2D, DP2E, DP2F and DP2G. In an exemplary embodiment according to FIG. 11, one pixel group may include two depth pixels. Depth pixels included in each pixel group operate in response to some of the plurality of photo control signals PG1 to PG4 having different phases, generate distance information of the object based on the light reflected by the object, and share a single ambient light cancellation circuit with each other.

The plurality of ambient light cancellation circuits ALC21 to ALC28 have the same structure or configuration, and remove the ambient light component from the light reflected by the object. For example, the first ambient light cancellation circuit ALC21 may be shared by the depth pixels DP21 and DP22 included in the first pixel group PG21.

Figure 12:
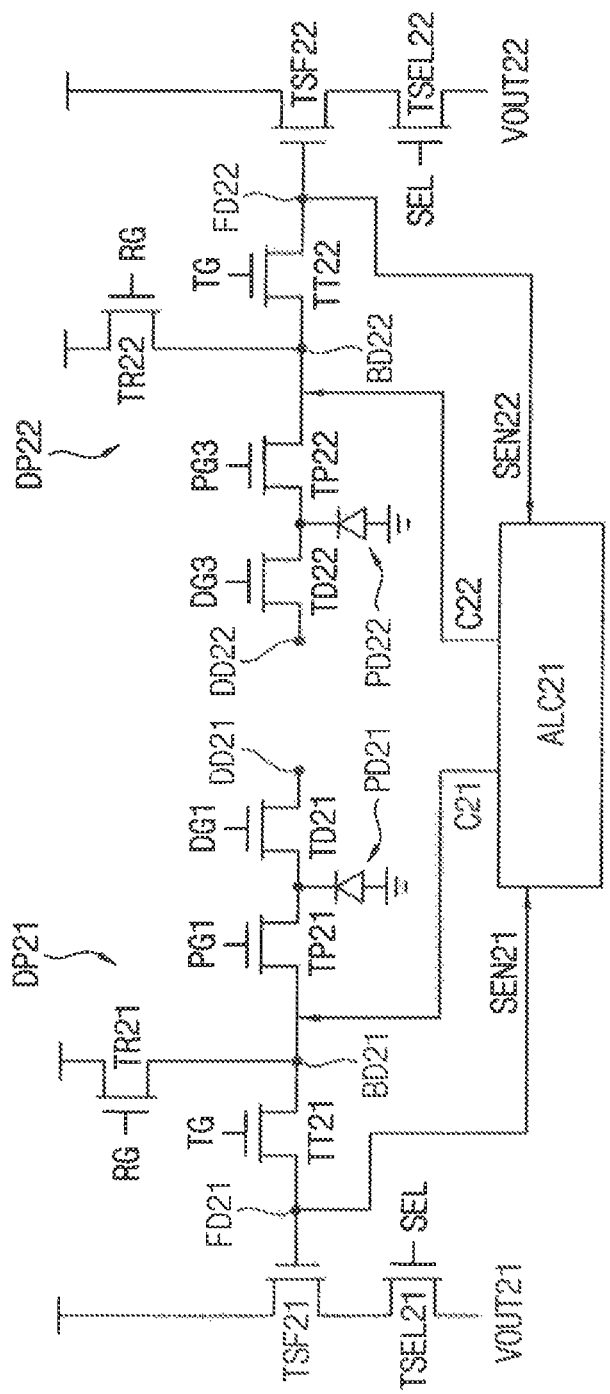
FIG. 12 is a circuit diagram illustrating an example of a first pixel group and a first ambient light cancellation circuit that are included in the pixel array of FIG. 11 according to exemplary embodiments of the inventive concept.

FIG. 12 is a circuit diagram illustrating an example of a first pixel group and a first ambient light cancellation circuit that are included in the pixel array of FIG. 11 according to exemplary embodiments of the inventive concept.

Referring to FIGS. 11 and 12, the depth pixels DP21 and DP22 that are included in the first pixel group PG21 and share the first ambient light cancellation circuit ALC21 may be implemented with a 1-tap (or a single-tap) structure.

Each of the depth pixels DP21 and DP22 in FIG. 12 may be substantially the same as each of the depth pixels DP11 and DP12 in FIG. 2, respectively, and the first ambient light cancellation circuit ALC21 in FIG. 12 may be substantially the same as the first ambient light cancellation circuit ALC11 in FIG. 2. The first depth pixel DP21 includes elements PD21, FD21, TP21, TD21, BD21, TT21, DD21, TR21, TSF21 and TSEL21, operates in response to the first photo control signal PG1 and the first drain control signal DG1, and provides a first output voltage VOUT21. The second depth pixel DP22 includes elements PD22, FD22, TP22, TD22, BD22, TT22, DD22, TR22, TSF22 and TSEL22, operates in response to the third photo control signal PG3 and the third drain control signal DG3, and provides a second output voltage VOUT22. The first ambient light cancellation circuit ALC21 provides a first compensation signal C21 and a second compensation signal C22 to floating diffusion regions (or bridge diffusion regions) in the first depth pixel DP21 and the second depth pixel DP22 based on a first sensing signal SEN21 and a second sensing signal SEN22.

In exemplary embodiments, the transfer transistors TT21 and TT22 and the bridge diffusion nodes BD21 and BD22 may be omitted, as described with reference to FIG. 5. In exemplary embodiments, one drain region may be shared by two depth pixels DP11 and DP12, as described with reference to FIG. 6.

In addition, the depth pixels DP23 and DP24 that are included in the second pixel group PG22 and share the second ambient light cancellation circuit ALC22 may also be implemented with a 1-tap (or a single-tap) structure, and may operate in response to the second photo control signal PG2 and the fourth photo control signal PG4, respectively.

Figure 13:
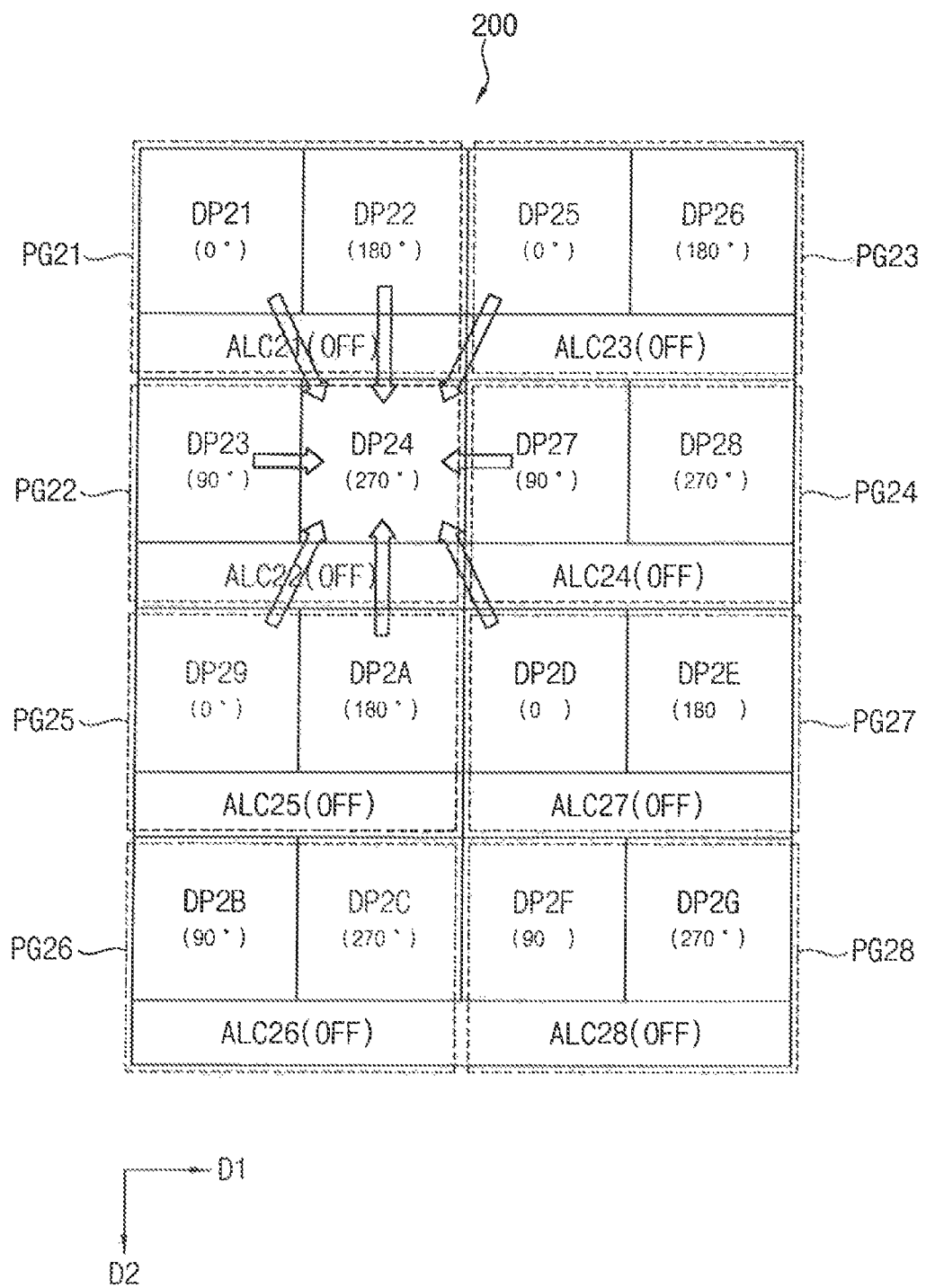
FIG. 13 is a diagram for describing a method of operating the pixel array of FIG. 11 according to exemplary embodiments of the inventive concept.

FIG. 13 is a diagram for describing a method of operating the pixel array of FIG. 11 according to exemplary embodiments of the inventive concept.

Referring to FIGS. 4, 11 and 13, the pixel array 200 may operate based on the fixed phase pattern scheme in which the phases of the photo control signals PG1 to PG4 are fixed for all integration intervals. A phase pattern in the pixel array 200 of FIGS. 11 and 13 may be substantially the same as a phase pattern in the pixel array 100 of FIGS. 1 and 7, except that one ambient light cancellation circuit is shared by two depth pixels in the pixel array 200. Thus, the pixel array 200 includes twice as many ambient light cancellation circuits as the pixel array 100. Thus, an operation of the pixel array 200 of FIGS. 11 and 13 may be substantially the same as an operation of the pixel array 100 of FIGS. 1 and 7. For convenience of description, a repeated explanation thereof will be omitted.

Figure 14:
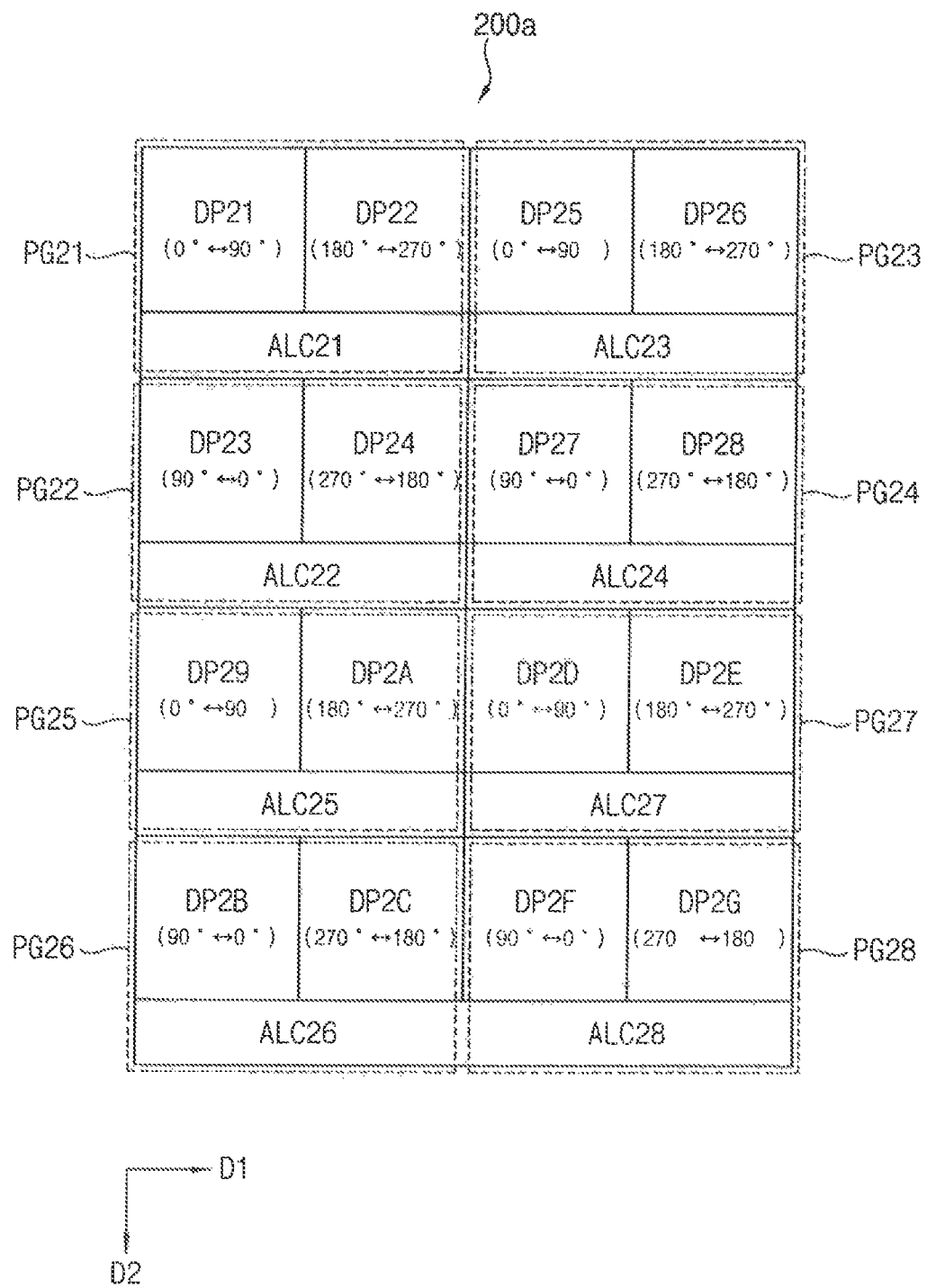
FIG. 14 is a plan view illustrating a pixel array in a three-dimensional image sensor according to exemplary embodiments of the inventive concept.
Figure 15:
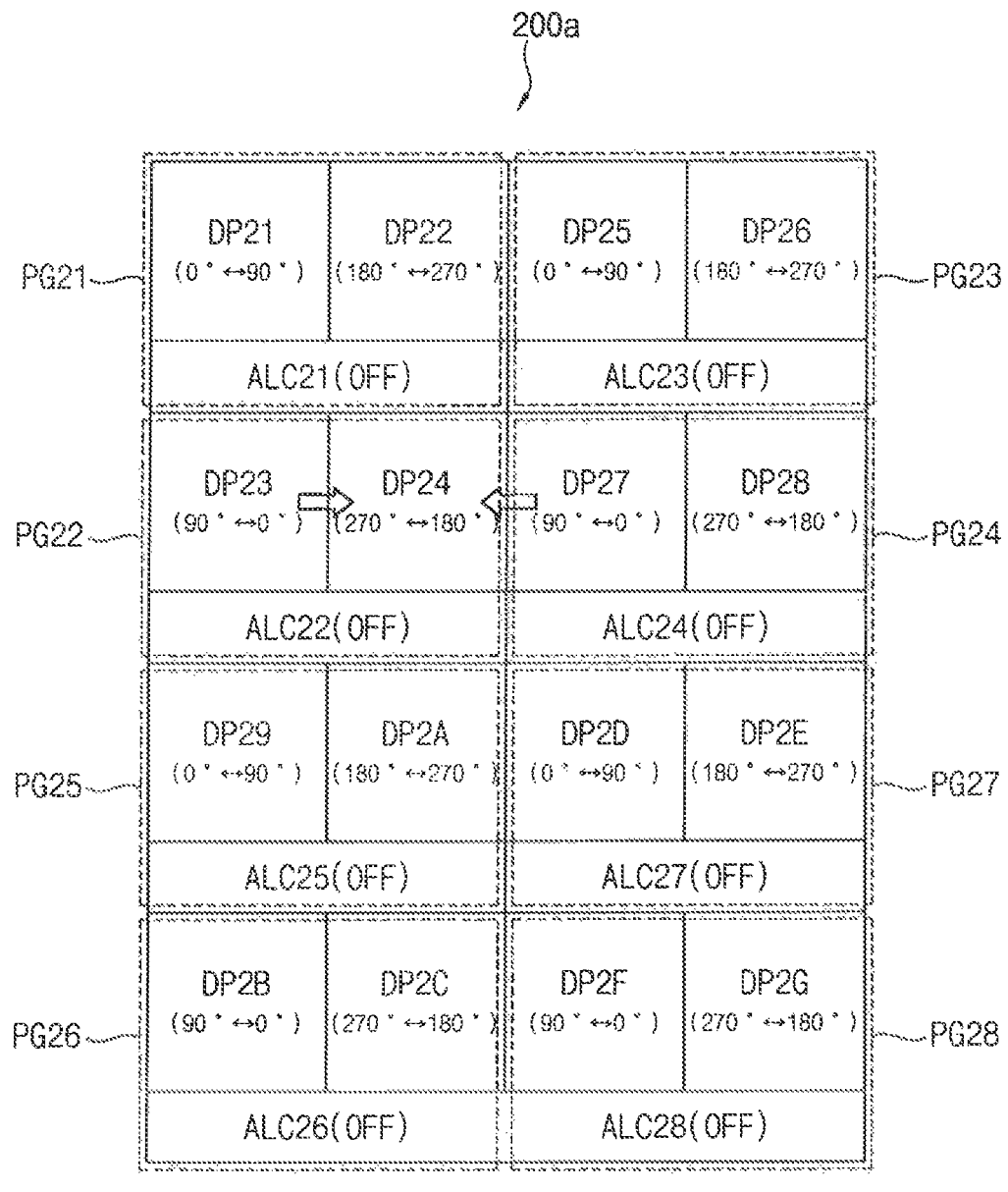
FIG. 15 is a diagram for describing a method of operating the pixel array of FIG. 14 according to exemplary embodiments of the inventive concept.

FIG. 14 is a plan view illustrating a pixel array in a three-dimensional image sensor according to exemplary embodiments of the inventive concept. FIG. 15 is a diagram for describing a method of operating the pixel array of FIG. 14 according to exemplary embodiments of the inventive concept.

Referring to FIGS. 4, 9, 14 and 15, a structure of a pixel array 200a of FIG. 14 may be substantially the same as a structure of the pixel array 200 of FIG. 11, and the pixel array 200a may operate based on the variable phase pattern scheme in which the phases of the photo control signals PG1 to PG4 are variable for two consecutive integration intervals. In addition, a phase pattern in the pixel array 200a of FIGS. 14 and 15 may be substantially the same as a phase pattern in the pixel array 100a of FIGS. 8 and 10, except that one ambient light cancellation circuit is shared by two depth pixels in the pixel array 200a. Thus, an operation of the pixel array 200a of FIGS. 14 and 15 may be substantially the same as an operation of the pixel array 100a of FIGS. 8 and 10, and thus, a repeated explanation will be omitted.

Figure 16:
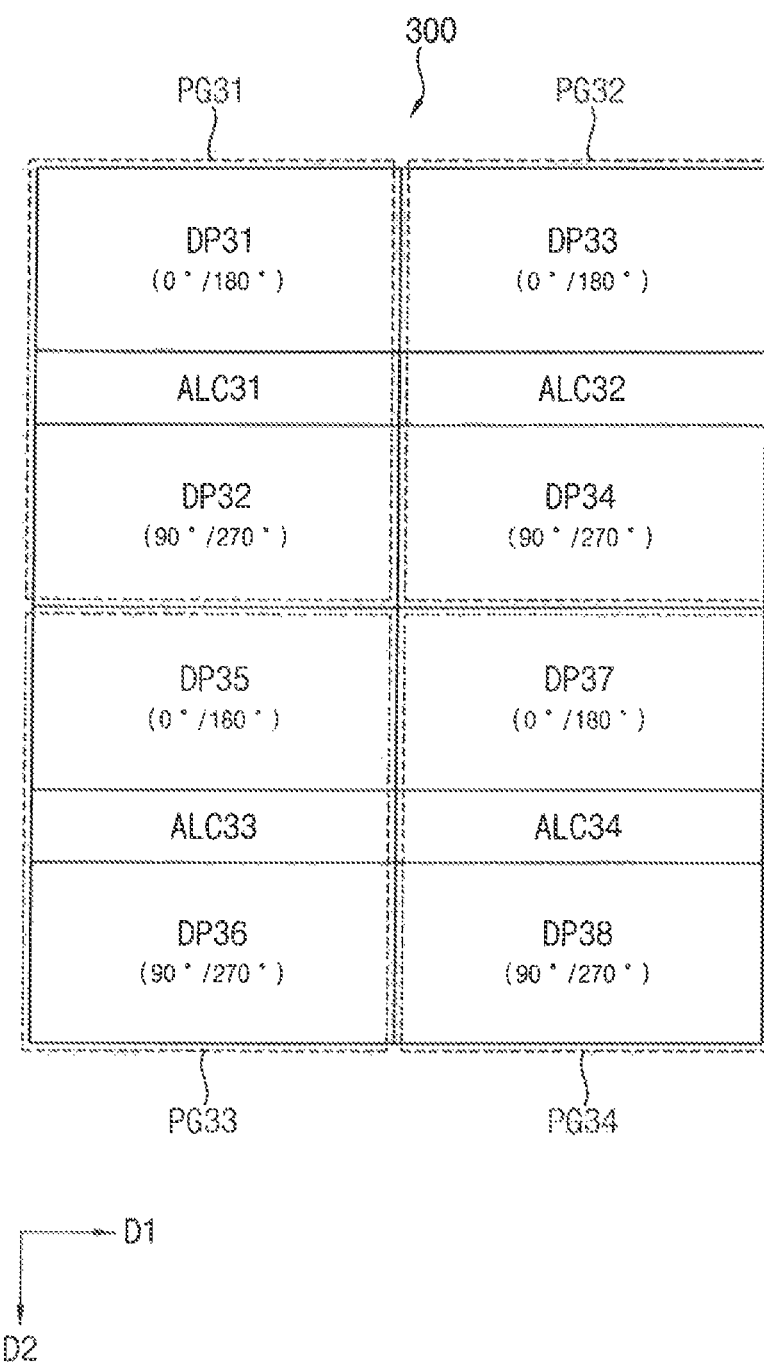
FIG. 16 is a plan view illustrating a pixel array in a three-dimensional image sensor according to exemplary embodiments of the inventive concept.

FIG. 16 is a plan view illustrating a pixel array in a three-dimensional image sensor according to exemplary embodiments of the inventive concept.

Referring to FIG. 16, a pixel array 300 included in a three-dimensional image sensor includes a plurality of pixel groups PG31, PG32, PG33 and PG34, and a plurality of ambient light cancellation circuits ALC31, ALC32, ALC33 and ALC34.

The plurality of pixel groups PG31 to PG34 have the same structure or configuration, and includes a plurality of depth pixels DP31, DP32, DP33, DP34, DP35, DP36, DP37 and DP38. In an exemplary embodiment according to FIG. 16, one pixel group may include two depth pixels. Depth pixels included in each pixel group operate in response to the plurality of photo control signals PG1 to PG4 having different phases, generate distance information of the object based on the light reflected by the object, and share a single ambient light cancellation circuit with each other.

The plurality of ambient light cancellation circuits ALC31 to ALC34 have the same structure or configuration, and remove the ambient light component from the light reflected by the object. For example, the first ambient light cancellation circuit ALC31 may be shared by the depth pixels DP31 and DP32 included in the first pixel group PG31.

Figure 17:
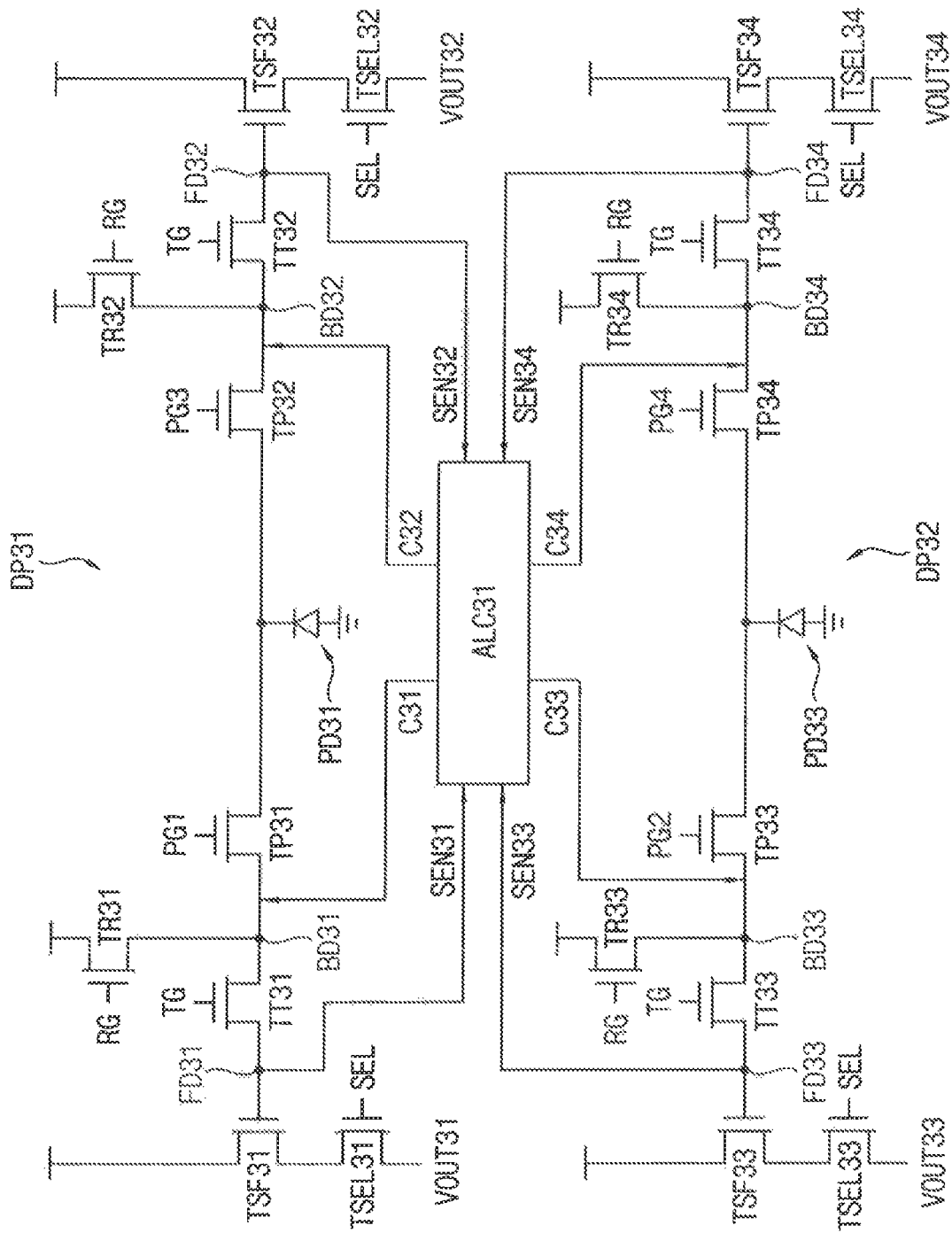
FIG. 17 is a circuit diagram illustrating an example of a first pixel group and a first ambient light cancellation circuit that are included in the pixel array of FIG. 16 according to exemplary embodiments of the inventive concept.
Figure 18:
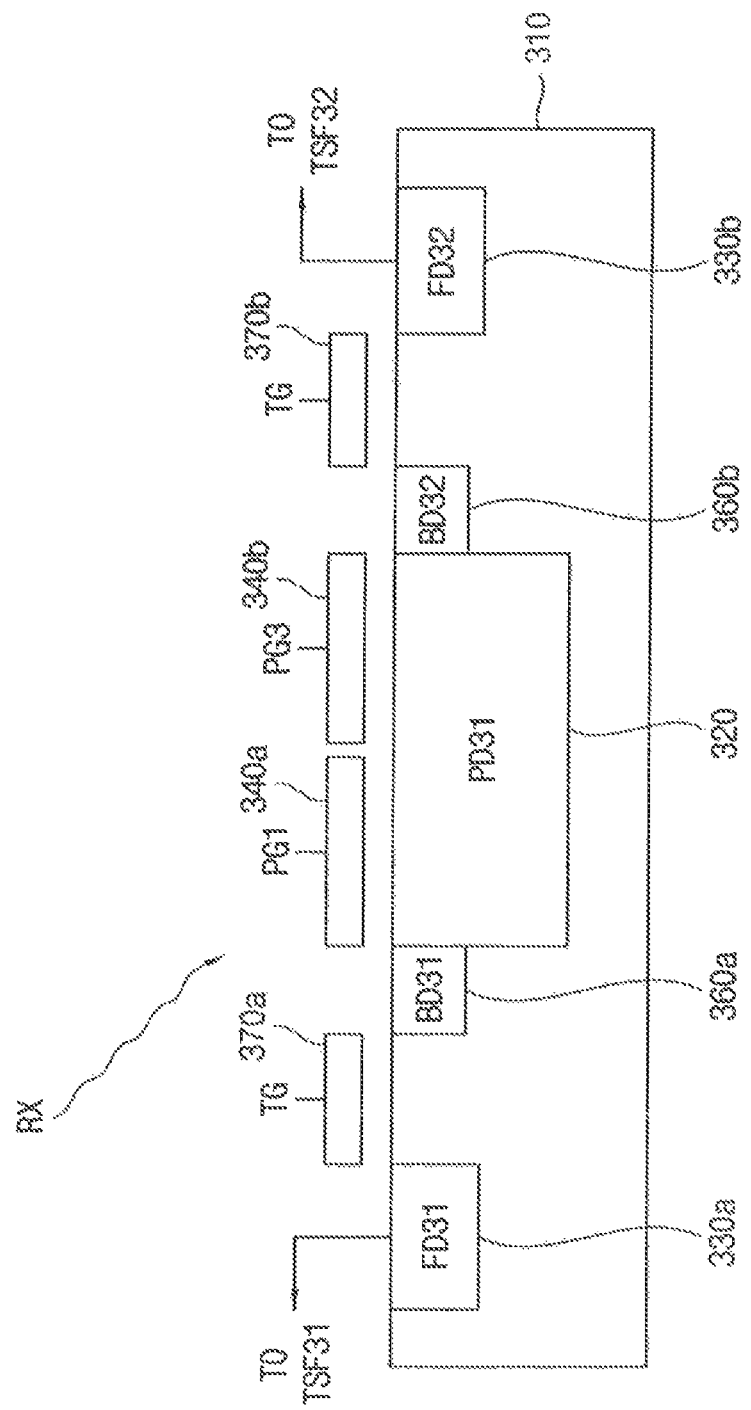
FIG. 18 is a cross-sectional view illustrating an example of a first depth pixel that is included in the first pixel group of FIG. 17 according to exemplary embodiments of the inventive concept.

FIG. 17 is a circuit diagram illustrating an example of a first pixel group and a first ambient light cancellation circuit that are included in the pixel array of FIG. 16 according to exemplary embodiments of the inventive concept. FIG. 18 is a cross-sectional view illustrating an example of a first depth pixel that is included in the first pixel group of FIG. 17 according to exemplary embodiments of the inventive concept.

Referring to FIGS. 16, 17 and 18, the depth pixels DP31 to DP34 that are included in the first pixel group PG31 and share the first ambient light cancellation circuit ALC31 may be implemented with a 2-tap structure. The 2-tap structure represents a structure of a depth pixel in which two floating diffusion regions are used by one photoelectric conversion region.

For example, the first depth pixel DP31 includes a first photoelectric conversion region 320, a first floating diffusion region 330a, a second floating diffusion region 330b, a first photo gate 340a, and a second photo gate 340b. The first photo gate 340a and the second photo gate 340b are formed over a semiconductor substrate 310. The first photoelectric conversion region 320, the first floating diffusion region 330a, and the second floating diffusion region 330b are formed in the semiconductor substrate 310. The first depth pixel DP31 may further include a first bridge diffusion region 360a, a second bridge diffusion region 360b, a first transfer gate 370a, a second transfer gate 370b, a first reset transistor TR31, a second reset transistor TR32, a first driving transistor TSF31, a second driving transistor TSF32, a first selection transistor TSEL31, and a second selection transistor TSEL32. In FIG. 17, elements corresponding to the first and second photo gates 340a and 340b and the first and second transfer gates 370a and 370b are illustrated as first and second photo transistors TP31 and TP32 and first and second transfer transistors TT31 and TT32, respectively. In FIG. 17, an element corresponding to the first photoelectric conversion region 320 is illustrated as a first photo diode PD31. In FIG. 17, elements corresponding to the first and second floating diffusion regions 330a and 330b and the first and second bridge diffusion regions 360a and 360b are illustrated as first and second floating diffusion nodes FD31 and FD32 and first and second bridge diffusion nodes BD31 and BD32, respectively.

The first photo gate 340a and the second photo gate 340b are disposed over the first photoelectric conversion region 320, and are activated (e.g., turned on/off) in response to the first photo control signal PG1 and the third photo control signal PG3, respectively. The first and third photo control signals PG1 and PG3 have opposite phases. The first photoelectric conversion region 320 collects, accumulates or generates photo charges based on the light reflected by the object when the first and second photo gates 340a and 340b are activated or turned on.

The other elements 330a, 330b, 360a, 360b, 370a, 370b, TR31, TR32, TSF31, TSF32, TSEL31 and TSEL32 included in the first depth pixel DP31 may be similar to the elements 130, 160, 170, TR11, TSF11 and TSEL11 included in the first depth pixel DP11 described with reference to FIGS. 2 and 3. The first depth pixel DP31 provides a first output voltage VOUT31 and a second output voltage VOUT32.

Similarly, the second depth pixel DP32 includes elements PD33, FD33, FD34, TP33, TP34, BD33, BD34, TT33, TT34, TR33, TR34, TSF33, TSF34, TSEL33, and TSEL34, operates in response to the second photo control signal PG2 and the fourth photo control signal PG4, which have opposite phases, and provides a third output voltage VOUT33 and a fourth output voltage VOUT34.

The first ambient light cancellation circuit ALC31 provides a first compensation signal C31, a second compensation signal C32, a third compensation signal C33, and a fourth compensation signal C34 to floating diffusion regions (or bridge diffusion regions) in the first depth pixel DP31 and the second depth pixel DP32 based on a first sensing signal SEN31, a second sensing signal SEN32, a third sensing signal SEN33, and a fourth sensing signal SEN34.

In exemplary embodiments, the transfer transistors TT31 to TT34 and the bridge diffusion nodes BD31 to BD34 may be omitted, as described with reference to FIG. 5. In exemplary embodiments, the first and third output voltages VOUT31 and VOUT33 may share one output signal line, and the second and fourth output voltages VOUT32 and VOUT34 may share another output signal line.

Figure 19:
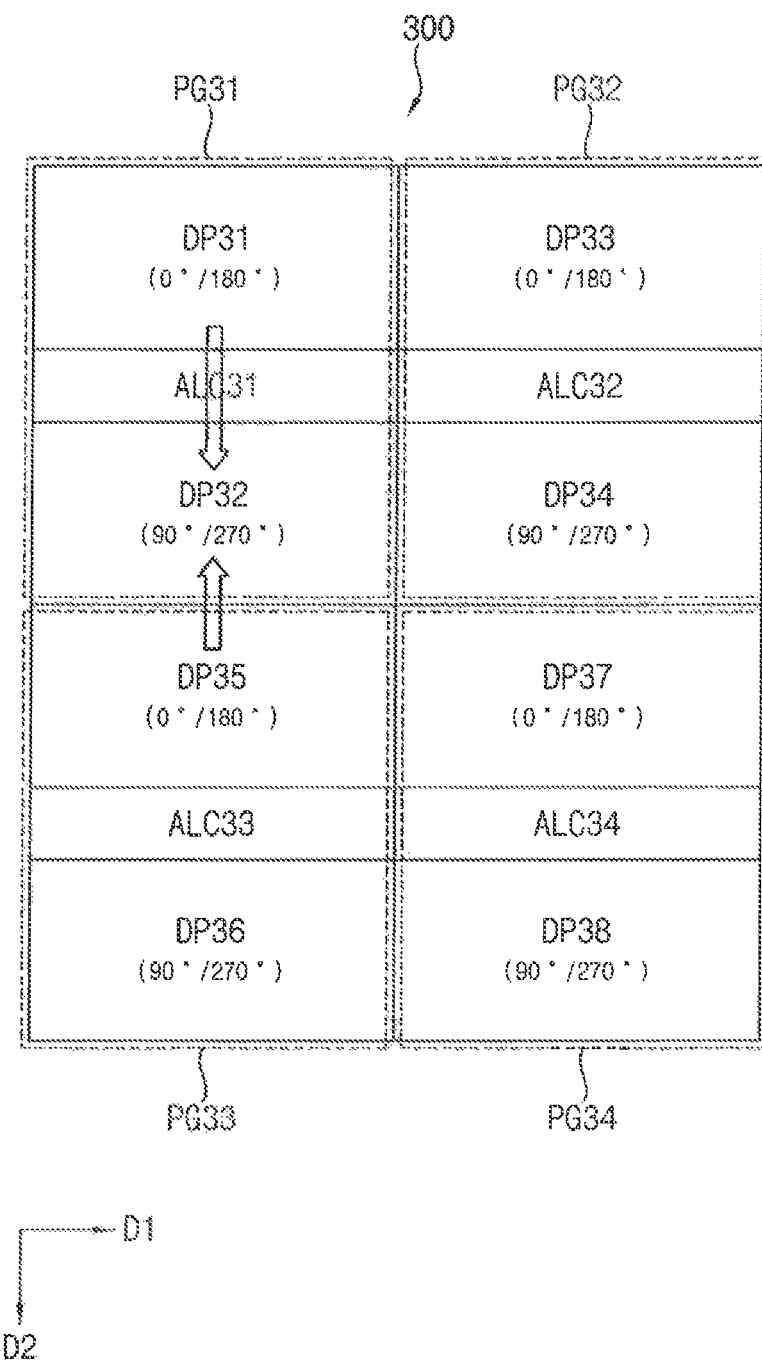
FIG. 19 is a diagram for describing a method of operating the pixel array of FIG. 16 according to exemplary embodiments of the inventive concept.

FIG. 19 is a diagram for describing a method of operating the pixel array of FIG. 16 according to exemplary embodiments of the inventive concept.

Referring to FIGS. 4, 16 and 19, the pixel array 300 may operate based on the fixed phase pattern scheme in which the phases of the photo control signals PG1 to PG4 are fixed for all integration intervals. For example, the first depth pixel DP31 may operate in response to the first and third photo control signals PG1 and PG3 in which the phase difference between the first photo control signal PG1 and the transmission light TX is always about 0 degrees and the phase difference between the third photo control signal PG3 and the transmission light TX is always about 180 degrees.

As with an example described above with reference to FIGS. 1 and 7, a unit of distance information obtainment in the pixel array 300 may be determined according to an operation mode of the three-dimensional image sensor, and distance information may be generated by different schemes according to the operation mode of the three-dimensional image sensor. In addition, the operation mode of the three-dimensional image sensor may be determined based on illuminance of the operating environment of the three-dimensional image sensor.

In exemplary embodiments, when the three-dimensional image sensor operates in the high illuminance mode, the pixel array 300 may operate as illustrated in FIG. 16. In this example, one pixel group (e.g., the pixel group PG31) including two depth pixels (e.g., the depth pixels DP31 and DP32) arranged in a 1*2 matrix formation may be determined as the unit of the distance information obtainment, distance information may be generated based on a 1*2 binning scheme in which a depth resolution is reduced by half, and the ambient light cancellation circuits ALC31 to ALC34 may be activated. For example, first phase information (e.g., phase information of about 0 degrees) and third phase information (e.g., phase information of about 180 degrees) may be obtained from the depth pixel DP31, and second phase information (e.g., phase information of about 90 degrees) and fourth phase information (e.g., phase information of about 270 degrees) may be obtained from the depth pixel DP32. One piece of distance information may be generated for the pixel group PG31 by performing a calculation on the first to fourth pieces of phase information. In this example, distance information may be obtained based on one depth frame (e.g., by sampling once).

In exemplary embodiments, when the three-dimensional image sensor operates in the low illuminance mode, the pixel array 300 may selectively operate as illustrated in FIG. 19. For example, in exemplary embodiments, an operation illustrated in FIG. 19 is not always activated in the low illuminance mode, but instead, is selectively activated in the low illuminance mode. For example, an operation illustrated in FIG. 19 may be selectively activated in the low illuminance mode and the high illuminance mode. In this example, one depth pixel (e.g., the depth pixel DP32) may be determined as the unit of the distance information obtainment, and the ambient light cancellation circuits ALC11 to ALC14 may be activated. For example, first phase information (e.g., phase information of about 0 degrees) and third phase information (e.g., phase information of about 180 degrees) may be obtained from the neighboring depth pixels DP31 and DP35, and second phase information (e.g., phase information of about 90 degrees) and fourth phase information (e.g., phase information of about 270 degrees) may be obtained from the depth pixel DP32 by itself. One piece of distance information may be generated for the depth pixel DP32 by performing phase interpolation on the first to fourth pieces of phase information.

Figure 20:
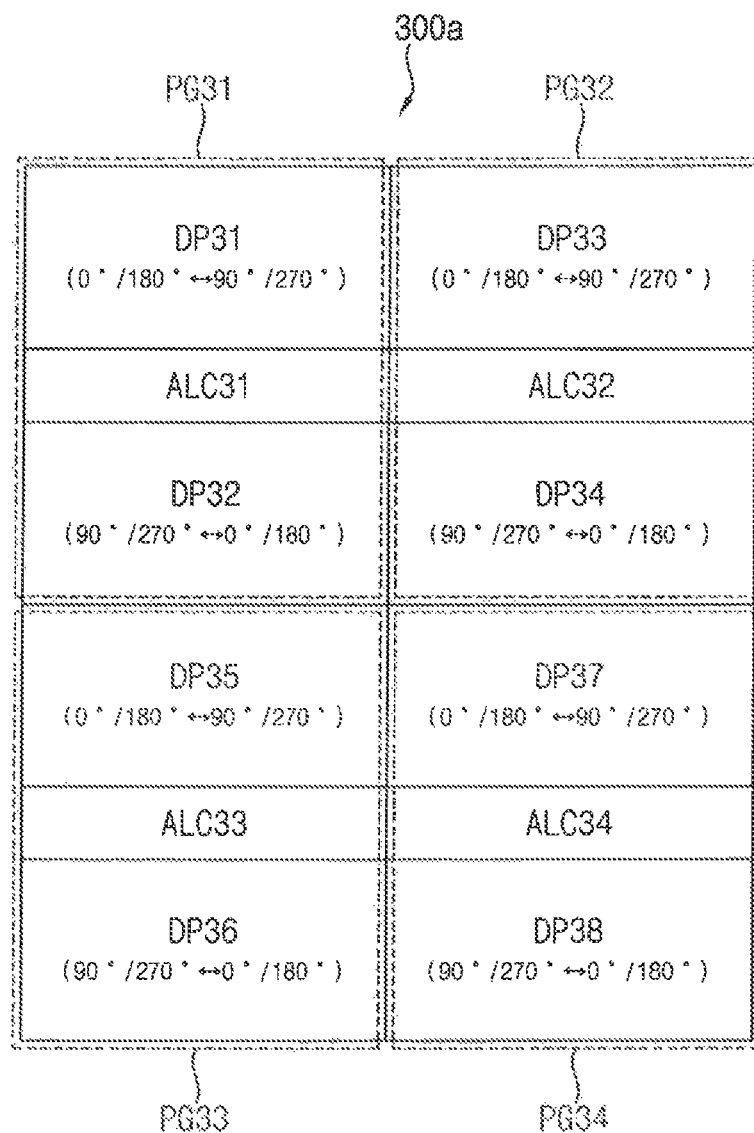
FIGS. 20 and 21 are plan views illustrating a pixel array in a three-dimensional image sensor according to exemplary embodiments of the inventive concept.
Figure 21:
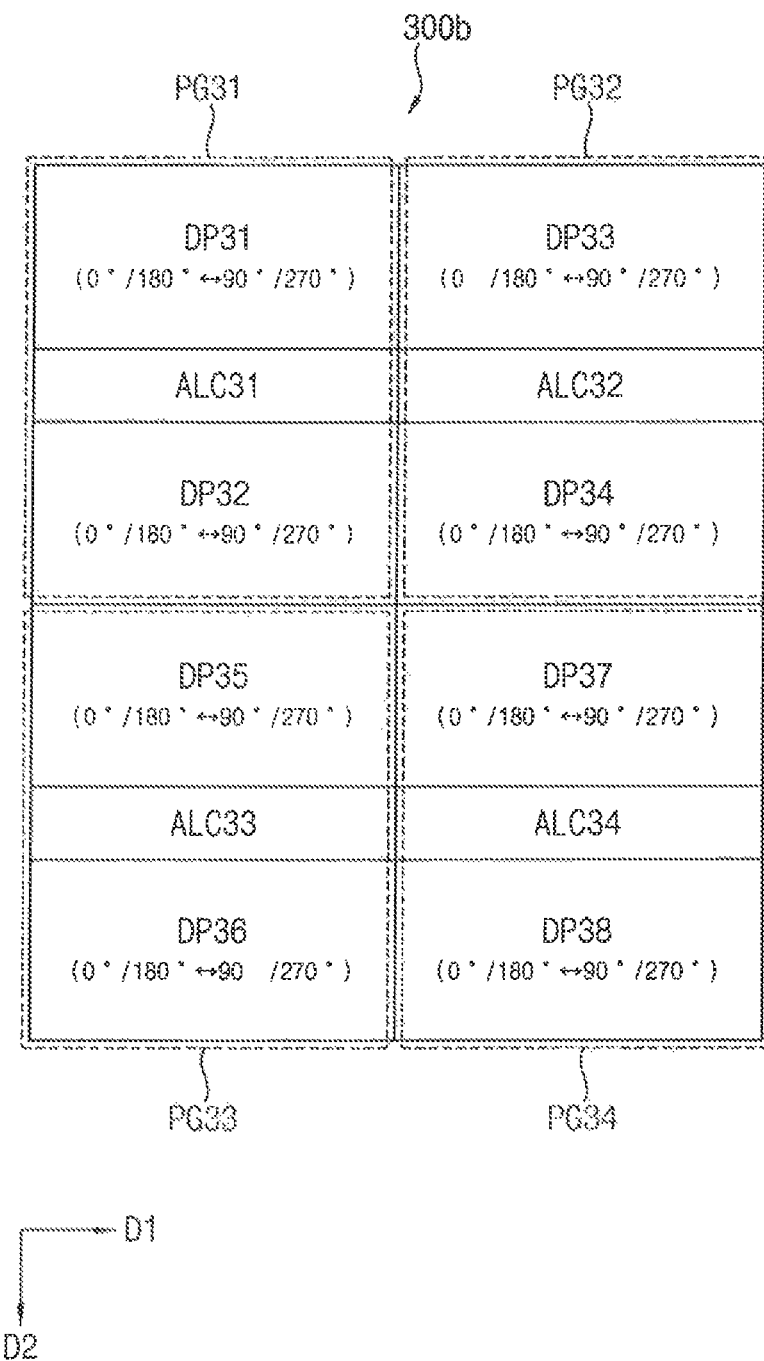

FIGS. 20 and 21 are plan views illustrating a pixel array in a three-dimensional image sensor according to exemplary embodiments of the inventive concept.

Referring to FIGS. 20 and 21, a pixel array 300a of FIG. 20 and a pixel array 300b of FIG. 21 may be substantially the same as the pixel array 300 of FIG. 16, except that the pixel array 300a and the pixel array 300b operate based on the variable phase pattern scheme in which the phases of the photo control signals PG1 to PG4 are variable for two consecutive integration intervals.

In the pixel array 300a and the pixel array 300b, the phases of the photo control signals PG1 to PG4 may be variable for two consecutive integration intervals. For example, each of the photo control signals PG1 to PG4 may have the phase illustrated in FIG. 4 for a first integration interval, and may have the phase illustrated in FIG. 9 for a second integration interval subsequent to the first integration interval. As illustrated in FIG. 20, phases of the photo control signals PG1 to PG4 applied to the depth pixels DP31 to DP38 may be the same in the first direction D1 and may be alternately arranged in the second direction D2. As illustrated in FIG. 21, phases of the photo control signals PG1 to PG4 applied to the depth pixels DP31 to DP38 may be the same in both the first direction D1 and the second direction D2.

In exemplary embodiments, when the three-dimensional image sensor operates in the high illuminance mode, the pixel array 300a and the pixel array 300b may operate as illustrated in FIGS. 20 and 21, respectively. In this example, one depth pixel (e.g., the depth pixel DP32) may be determined as the unit of the distance information obtainment, and the ambient light cancellation circuits ALC11 to ALC14 may be activated. For example, all of first, second, third and fourth phase information (e.g., phase information of about 0, 90, 180 and 270 degrees) may be obtained from the depth pixel DP32 by itself, and one piece of distance information may be generated for the depth pixel DP32 by performing a calculation on the first to fourth pieces of phase information without phase interpolation.

In exemplary embodiments, when the three-dimensional image sensor operates in the low illuminance mode, the pixel array 300a and the pixel array 300b may operate as illustrated in FIGS. 20 and 21, respectively, without changing the operation scheme.

Figure 22:
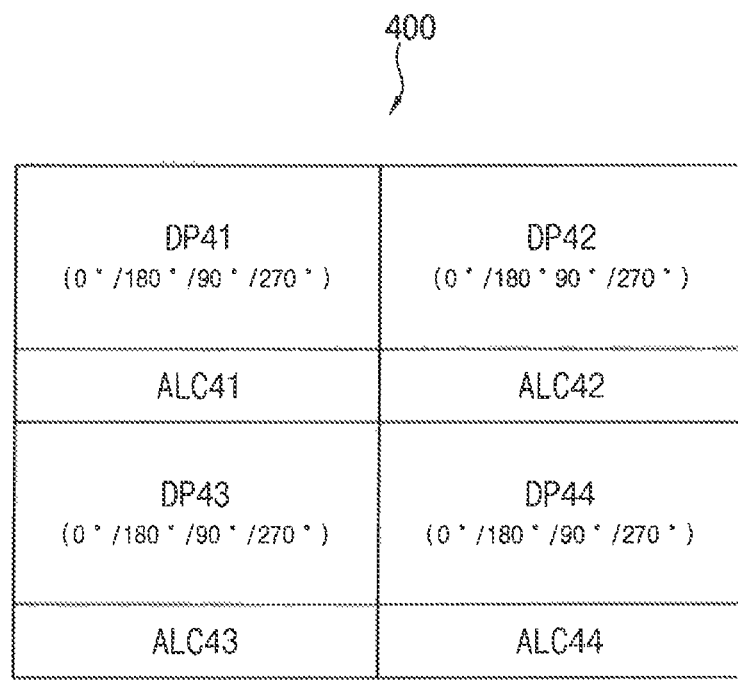
FIG. 22 is a plan view illustrating a pixel array in a three-dimensional image sensor according to exemplary embodiments of the inventive concept.
Figure 22:
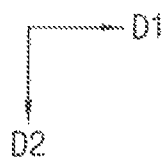

FIG. 22 is a plan view illustrating a pixel array in a three-dimensional image sensor according to exemplary embodiments of the inventive concept. FIG. 23 is a circuit diagram illustrating an example of a first depth pixel and a first ambient light cancellation circuit that are included in the pixel array of FIG. 22 according to exemplary embodiments of the inventive concept.

Figure 23:
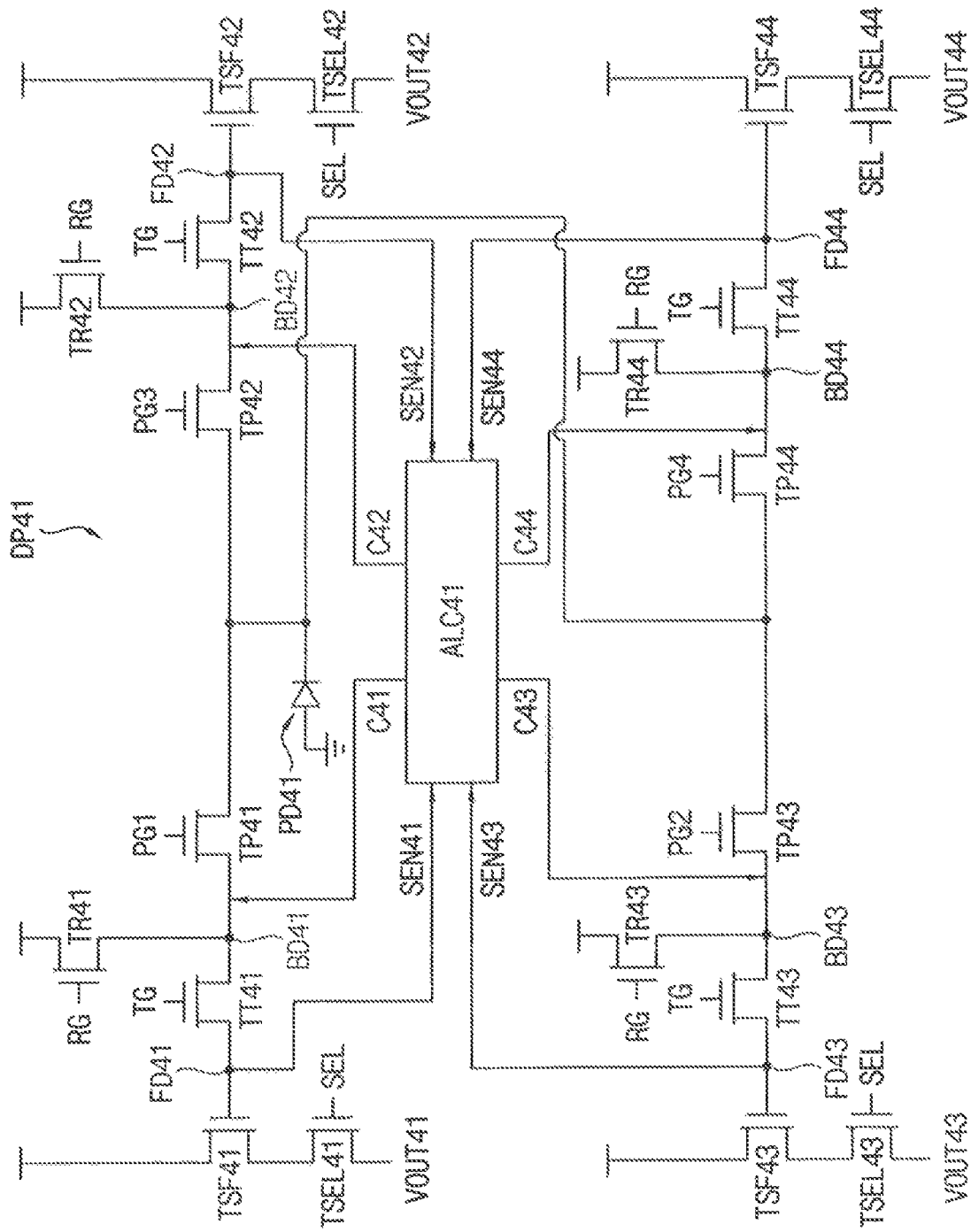
FIG. 23 is a circuit diagram illustrating an example of a first depth pixel and a first ambient light cancellation circuit that are included in the pixel array of FIG. 22 according to exemplary embodiments of the inventive concept.

Referring to FIGS. 22 and 23, a pixel array 400 included in a three-dimensional image sensor includes a plurality of depth pixels DP41, DP42, DP43 and DP44, and a plurality of ambient light cancellation circuits ALC41, ALC42, ALC43 and ALC44.

The plurality of depth pixels DP41 to DP44 have the same structure or configuration, operate in response to the plurality of photo control signals PG1 to PG4 having different phases, generate distance information of the object based on the light reflected by the object, and include a plurality of floating diffusion regions that share a single ambient light cancellation circuit with each other.

The first depth pixel DP41 may be implemented with a 4-tap structure. The 4-tap structure represents a structure of a depth pixel in which four floating diffusion regions are used by one photoelectric conversion region. For example, the first depth pixel DP41 includes a photo diode PD41 corresponding to a photoelectric conversion region, four floating diffusion nodes FD41, FD42, FD43 and FD44 corresponding to four floating diffusion regions, and four photo transistors TP41, TP42, TP43 and TP44 corresponding to four photo gates. The first depth pixel DP41 may further include other elements BD41, BD42, BD43, BD44, TT41, TT42, TT43, TT44, TR41, TR42, TR43, TR44, TSF41, TSF42, TSF43, TSF44, TSEL41, TSEL42, TSEL43 and TSEL44. A structure and operation of the first depth pixel DP41 may be similar to those of the first depth pixel DP31 described with reference to FIGS. 17 and 18, except that the photo diode PD41 is connected to four photo transistors TP41 to TP44. The first depth pixel DP41 operates in response to the photo control signals PG1 to PG4, and provides output voltages VOUT41, VOUT42, VOUT43 and VOUT44.

The plurality of ambient light cancellation circuits ALC41 to ALC44 have the same structure or configuration, remove the ambient light component from the light reflected by the object, and are shared by floating diffusion regions included in the same depth pixel. For example, the first ambient light cancellation circuit ALC41 may be shared by the plurality of floating diffusion regions included in the first depth pixel DP41. The first ambient light cancellation circuit ALC41 provides compensation signals C41, C42, C43 and C44 to the floating diffusion regions (or bridge diffusion regions) in the first depth pixel DP41 based on sensing signals SEN41, SEN42, SEN43 and SEN44.

Figure 24:
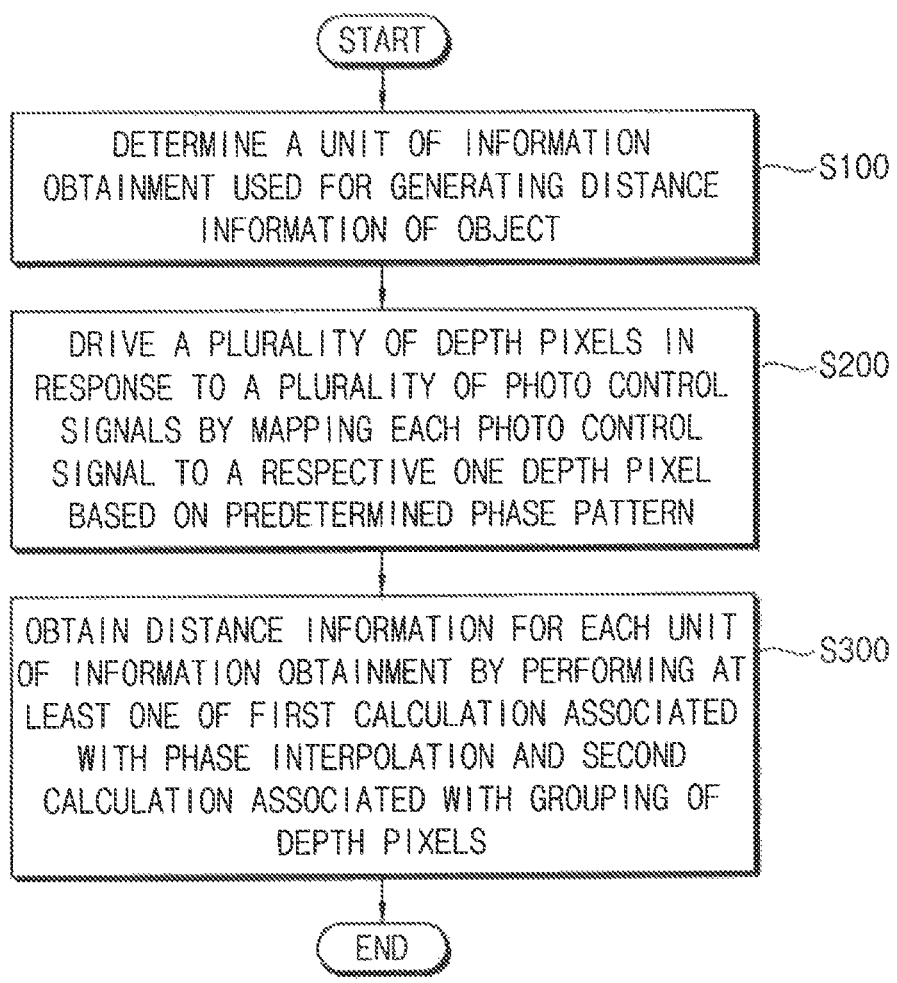
FIG. 24 is a flow chart illustrating a method of operating a three-dimensional image sensor according to exemplary embodiments of the inventive concept.

FIG. 24 is a flow chart illustrating a method of operating a three-dimensional image sensor according to exemplary embodiments of the inventive concept.

Referring to FIG. 24, in a method of operating a three-dimensional image sensor according to exemplary embodiments, the three-dimensional image sensor includes a pixel array including a plurality of depth pixels configured to operate in response to the plurality of photo control signals PG1 to PG4, which have different phases.

In the pixel array, a unit of distance information obtainment is determined in operation S100. The unit of the distance information obtainment represents a minimum unit for generating one piece of distance information, and is used for generating the distance information of the object based on the light reflected by the object. In operation S200, the plurality of depth pixels are driven or operate in response to the plurality of photo control signals PG1 to PG4 by mapping one of the plurality of photo control signals PG1 to PG4 to a respective one of the plurality of depth pixels based on a predetermined phase pattern. In operation S300, distance information for each unit of the distance information obtainment is obtained by performing at least one of a first calculation in which phase interpolation is performed on phase information obtained from neighboring depth pixels, and a second calculation in which some of the plurality of depth pixels adjacent to each other are grouped and phase information obtained from the grouped depth pixels are used for obtaining each piece of distance information. Thus, various schemes for generating the distance information may be performed without an ambient light cancellation circuit and based on the fixed phase pattern scheme, and not the variable phase pattern scheme.

FIGS. 25, 26, 27, 28 and 29 are diagrams for describing a method of operating a three-dimensional image sensor according to exemplary embodiments of the inventive concept.

Figure 25:
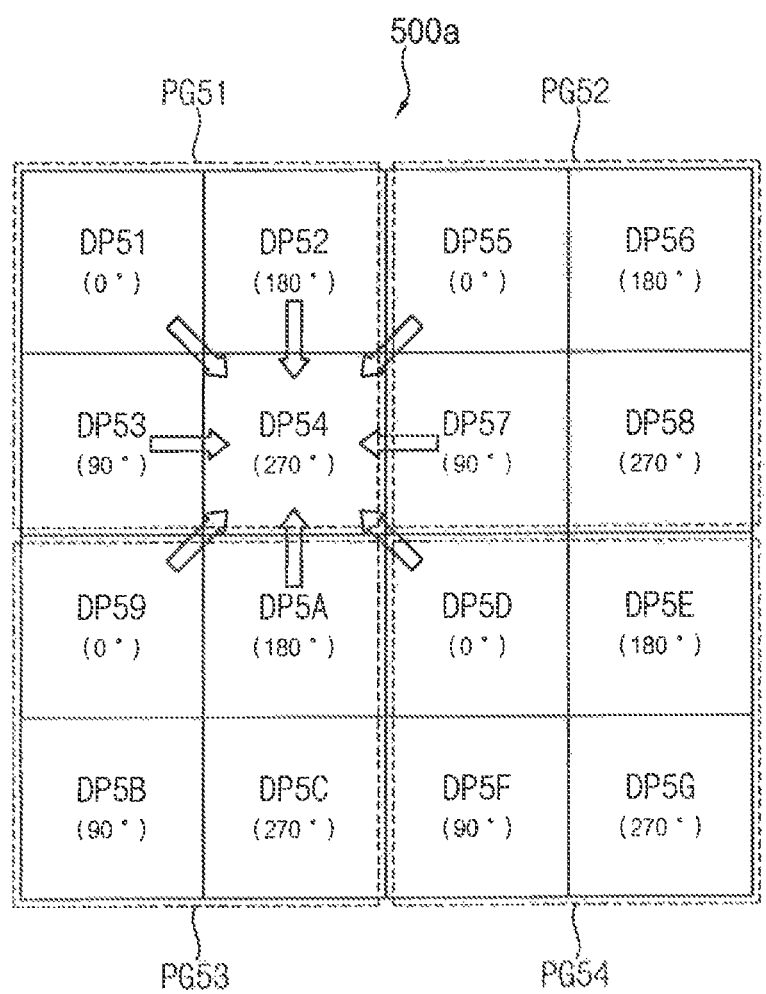
Figure 26:
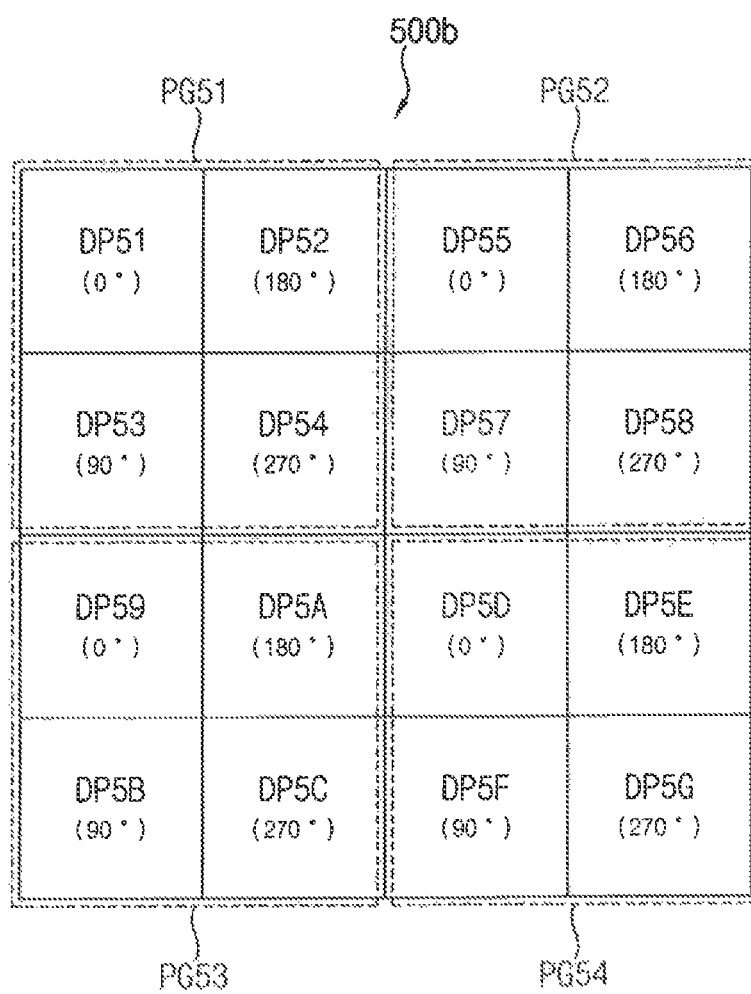
Figure 27:
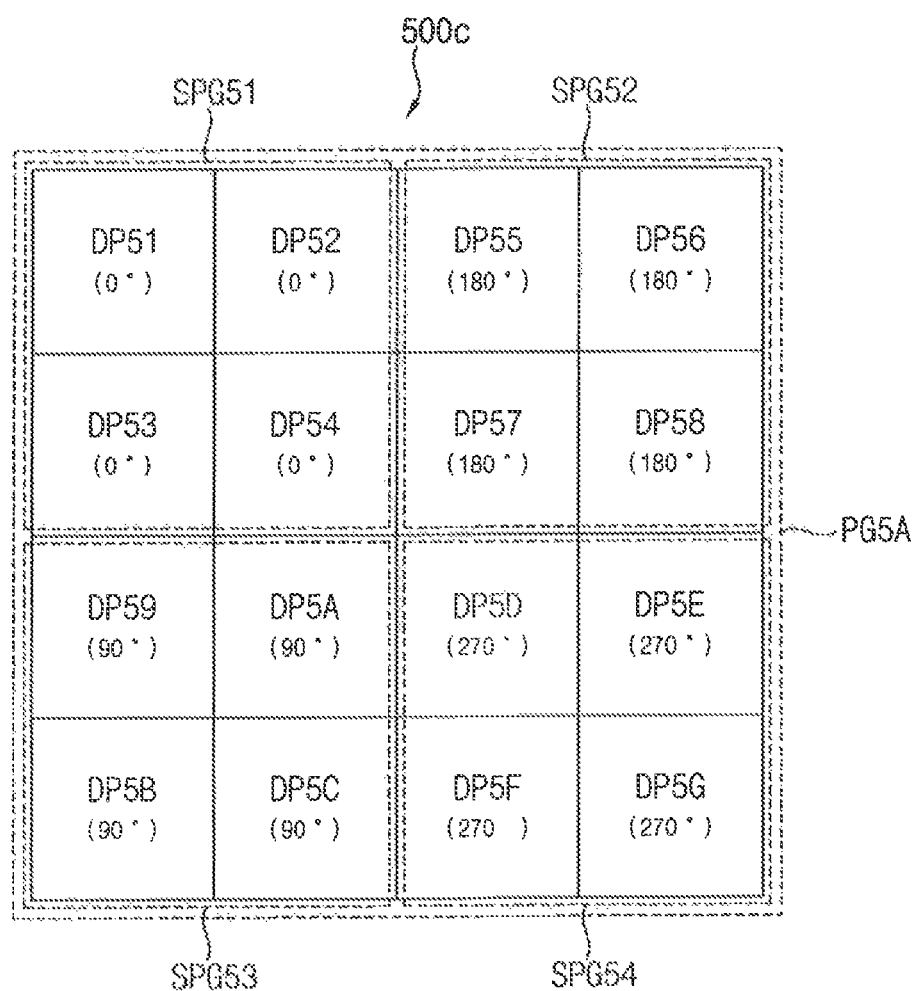

Referring to FIGS. 25, 26, 27, 28 and 29, each of a pixel array 500a of FIG. 25, a pixel array 500b of FIG. 26, and a pixel array 500c of FIG. 27 includes a plurality of depth pixels DP51, DP52, DP53, DP54, DP55, DP56, DP57, DP58, DP59, DP5A, DP5B, DP5C, DP5D, DP5E, DP5F and DP5G. Each of a pixel array 600a of FIG. 28 and a pixel array 600b of FIG. 29 includes a plurality of depth pixels DP601, DP602, DP603, DP604, DP605, DP606, DP607, DP608, DP609, DP610, DP611, DP612, DP613, DP614, DP615, DP616, DP617, DP618, DP619, DP620, DP621, DP622, DP623, DP624, DP625, DP626, DP627, DP628, DP629, DP630, DP631, DP632, DP633, DP634, DP635, DP636, DP637, DP638, DP639, DP640, DP641, DP642, DP643, DP644, DP645, DP646, DP647, DP648, DP649, DP650, DP651, DP652, DP653, DP654, DP655, DP656, DP657, DP658, DP659, DP660, DP661, DP662, DP663 and DP664. For example, each depth pixel may be implemented with a 1-tap structure.

Figure 28:
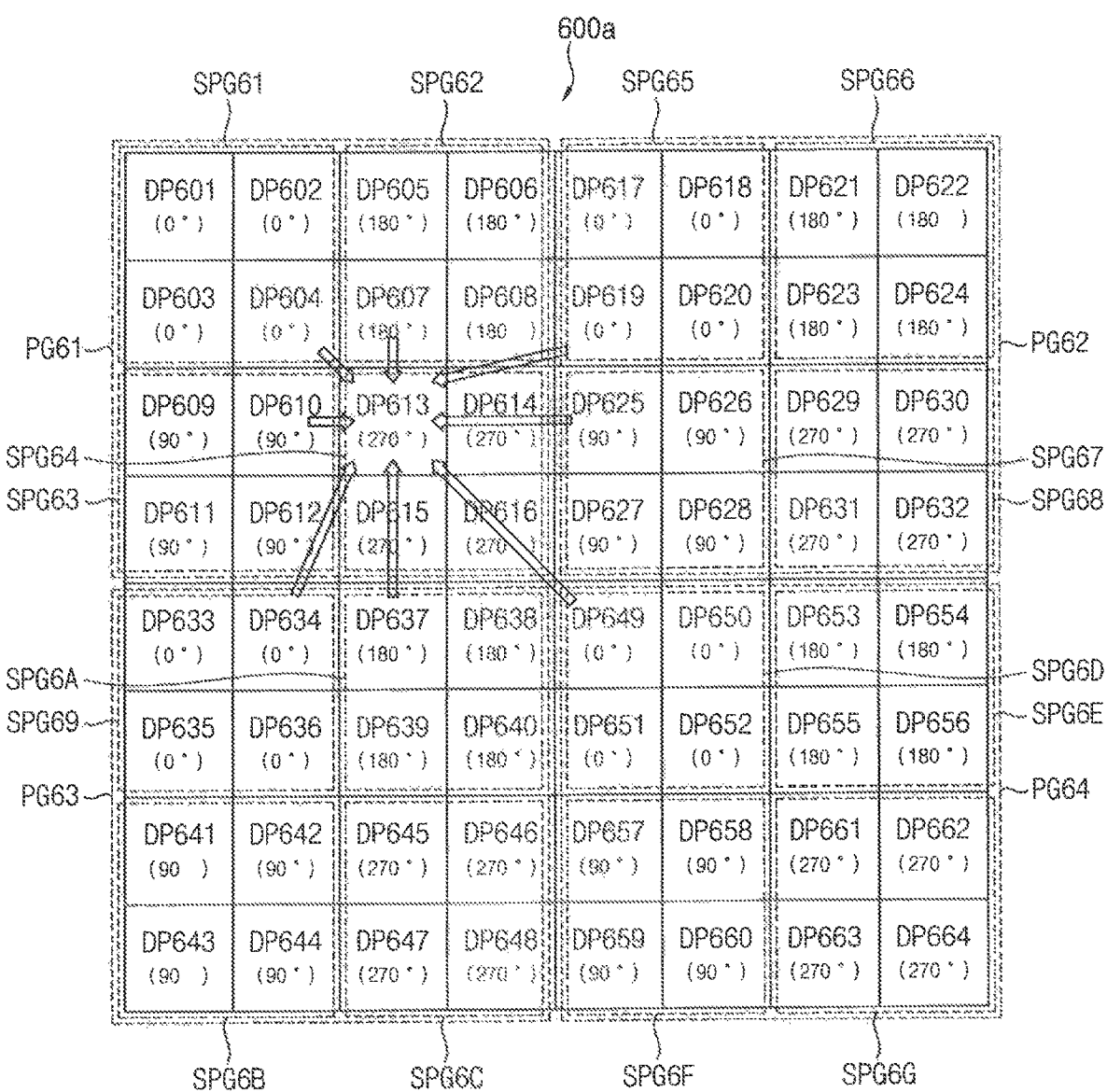
Figure 29:
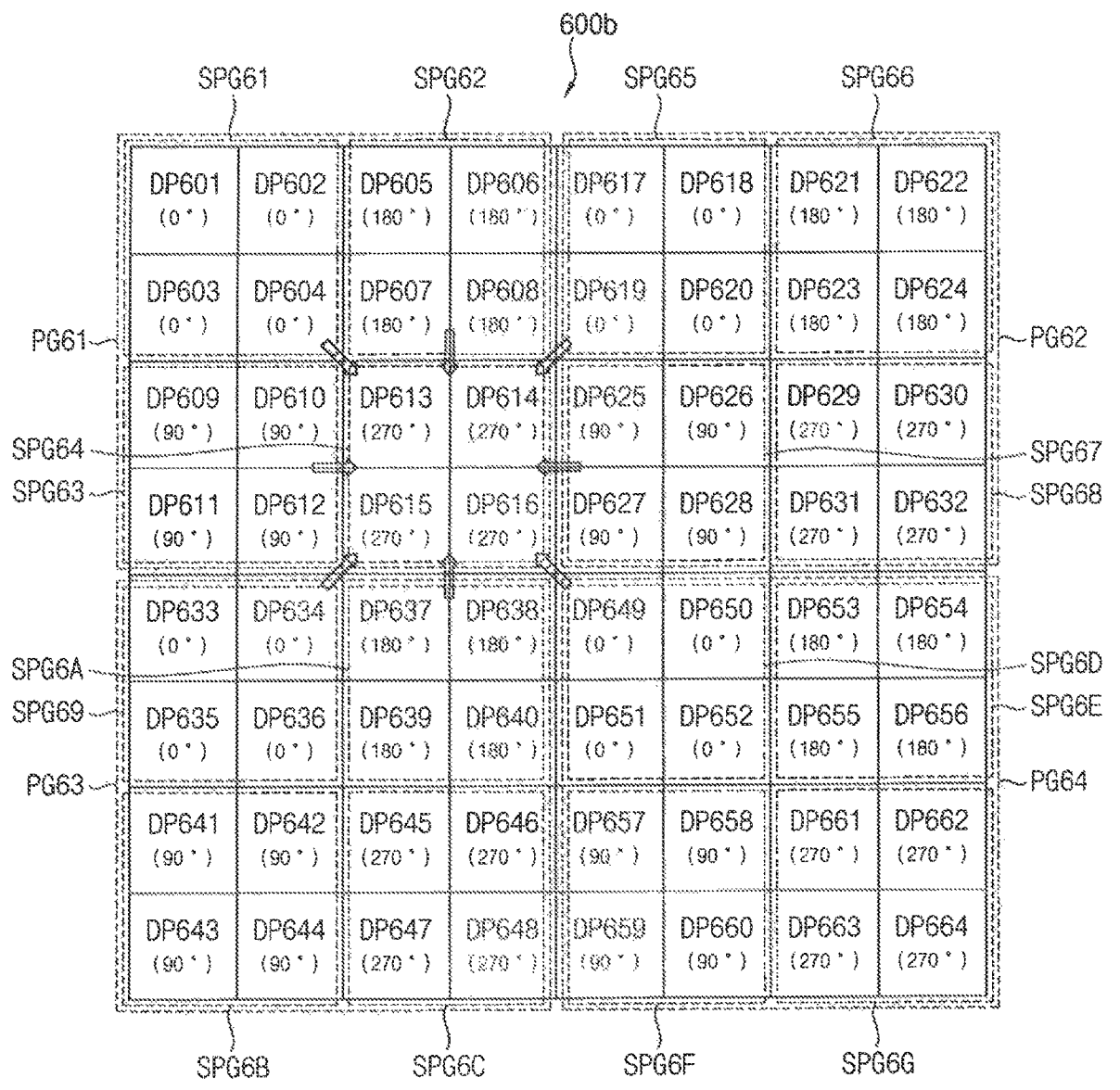

In FIGS. 25 and 26, four depth pixels arranged in a 2*2 matrix formation operate in response to four different photo control signals PG1 to PG4, respectively. In FIGS. 27, 28 and 29, four depth pixels arranged in a 2*2 matrix formation operate in response to one of the photo control signals PG1 to PG4 (e.g., in response to the same photo control signal).

In the pixel array 500a of FIG. 25, one depth pixel (e.g., the depth pixel DP54) may be determined as the unit of the distance information obtainment, the first calculation may be performed similar to an operation described with reference to FIG. 7, and thus, one piece of distance information is generated for one depth pixel. This scheme may be referred to as a full-read scheme.

In the pixel array 500b of FIG. 26, one pixel group (e.g., pixel group PG51) of pixel groups PG51, PG52, PG53 and PG54 may be determined as the unit of the distance information obtainment, the second calculation may be performed similar to an operation described with reference to FIG. 1, and thus, one piece of distance information is generated for one pixel group. This scheme may be referred to as a 4-pixel-merged binning scheme.

In the pixel array 500c of FIG. 27, one pixel group PG5A including four sub pixel groups SPG51, SPG52, SPG53 and SPG54 may be determined as the unit of the distance information obtainment, each sub pixel group may be treated as a single unit by averaging phase information of four depth pixels in the same sub pixel group, the second calculation may be performed similar to an operation described with reference to FIG. 1, and thus, one piece of distance information is generated for one pixel group. This scheme may be referred to as an averaged binning scheme.

In the pixel array 600a of FIG. 28, one depth pixel (e.g., the depth pixel DP613) may be determined as the unit of the distance information obtainment, the first calculation may be performed similar to an operation described with reference to FIG. 7, and thus, one piece of distance information is generated for one depth pixel. This scheme may be referred to as a tetra phase scheme. Since distances between two depth pixels are different from each other according to locations of neighboring pixels, a weighted phase interpolation may be performed. The weighted phase interpolation represents a type of phase interpolation using weighted values in which the weighted values are different from each other according to a distance between two depth pixels.

In the pixel array 600b of FIG. 29, one sub pixel group (e.g., sub pixel group SPG64) of sub pixel groups SPG61, SPG62, SPG63, SPG64, SPG65, SPG66, SPG67, SPG68, SPG69, SPG6A, SPG6B, SPG6C, SPG6D, SPG6E, SPG6F and SPG6G that are included in pixel groups PG61, PG62, PG63 and PG64 may be determined as the unit of the distance information obtainment, each sub pixel group may be treated as a single unit by averaging phase information of four depth pixels in the same sub pixel group, the first calculation may be performed similar to an operation described with reference to FIG. 7, and thus, one piece of distance information is generated for one sub pixel group.

Figure 30:
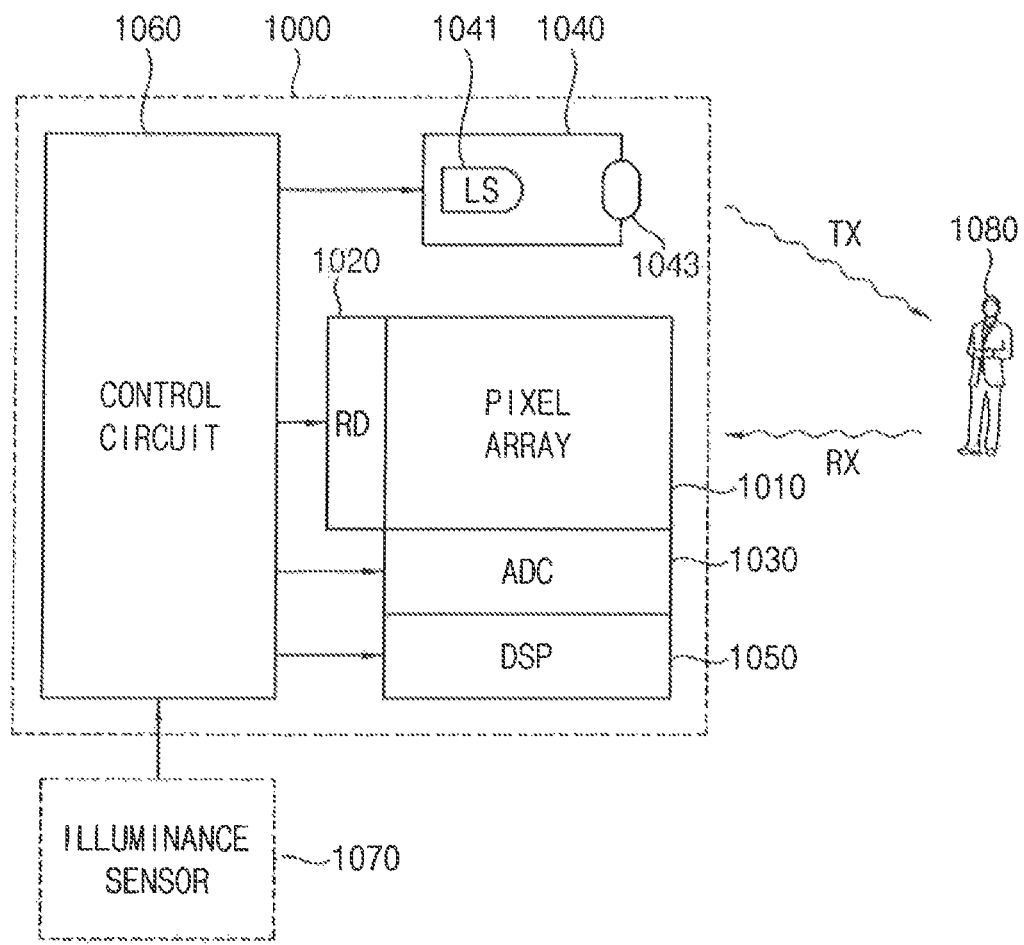
FIG. 30 is a block diagram illustrating a three-dimensional image sensor according to exemplary embodiments of the inventive concept.

FIG. 30 is a block diagram illustrating a three-dimensional image sensor according to exemplary embodiments of the inventive concept.

Referring to FIG. 30, a three-dimensional image sensor 1000 includes a pixel array 1010, a row driving (RD) circuit 1020, an analog-to-digital converting (ADC) circuit 1030, a light source module 1040, a digital signal processing (DSP) circuit 1050, and a control circuit 1060. The three-dimensional image sensor 1000 may further include an illuminance sensor 1070.

The light source module 1040 emits transmission light TX having a predetermined wavelength. An object 1080 is illuminated with the transmission light TX. For example, the light source module 1040 may emit infrared light or near-infrared light. The light source module 1040 may include a light source 1041 and a lens 1043, and may further include a filter. The pixel array 1010 includes a plurality of depth pixels and receives light RX reflected by the object 1080. The pixel array 1010 may be the pixel array according to the exemplary embodiments described above. The row driving circuit 1020 generates driving signals to drive each row. The analog-to-digital converting circuit 1030 converts analog signals output from the pixel array 1010 into digital signals. The digital signal processing circuit 1050 performs image data processing on the digital signals. The digital signal processing circuit 1050 may perform the method according to the exemplary embodiments described above (e.g., determines the operation mode, the unit and/or scheme of the distance information obtainment, performs the first calculation and/or the second calculation, etc.). The control circuit 1060 controls the elements 1020, 1030, 1040 and 1050 in the three-dimensional image sensor 1000. The illuminance sensor 1070 may be disposed or located inside or outside of the three-dimensional image sensor 1000, and may determine the illuminance of the operating environment of the three-dimensional image sensor 1000. In exemplary embodiments, the illuminance sensor 1070 may be omitted. In this case, the pixel array 1010 may perform a pre-sensing for checking the illuminance of the operating environment of the three-dimensional image sensor 1000.

Exemplary embodiments of the inventive concept may be applied to various devices and systems that include a three-dimensional image sensor. For example, exemplary embodiments of the inventive concept may be applied to systems such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of Things (IoT) device, an Internet of Everything (IoE) device, an e-book reader, a virtual reality (VR) device, an augmented reality (AR) device, a robotic device, etc.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A pixel array included in a three-dimensional image sensor, the pixel array comprising:
   a first pixel group, comprising:
      a first group of a plurality of depth pixels configured to operate in response to a plurality of photo control signals having different phases, and to generate first distance information of an object based on a light reflected by the object; and
      a first ambient light cancellation circuit configured to remove an ambient light component from the light reflected by the object, wherein the first ambient light cancellation circuit is shared by the first group of the plurality of depth pixels,
   wherein each depth pixel of the first group of the plurality of depth pixels comprises:
      a photoelectric conversion region configured to collect photo charges based on the light reflected by the object;
      a floating diffusion region connected to the first ambient light cancellation circuit, wherein the floating diffusion region is configured to accumulate the photo charges;
      a photo gate configured to be activated in response to one of the plurality of photo control signals; and
      a drain gate configured to be activated in response to one of a plurality of drain control signals, wherein each of the plurality of drain control signals has a phase opposite to a phase of a respective one of the plurality of photo control signals,
   wherein the photoelectric conversion region accumulates the photo charges when the photo gate is activated, and the photo charges in the photoelectric conversion region are released when the drain gate is activated.

2. The pixel array of claim 1, wherein:
   the plurality of photo control signals comprises a first photo control signal, a second photo control signal, a third photo control signal, and a fourth photo control signal, wherein the first, second, third, and fourth photo control signals have different phases, and
   the first pixel group comprises:
      a first depth pixel configured to operate in response to the first photo control signal;
      a second depth pixel configured to operate in response to the third photo control signal;
      a third depth pixel configured to operate in response to the second photo control signal; and
      a fourth depth pixel configured to operate in response to the fourth photo control signal.

3. The pixel array of claim 2, wherein a phase of each of the first, second, third, and fourth photo control signals is fixed for all of a plurality of integration intervals.

4. The pixel array of claim 2, wherein a phase of each of the first, second, third, and fourth photo control signals is variable for two consecutive integration intervals.

5. The pixel array of claim 2, wherein the first ambient light cancellation circuit is configured to:
   be activated to remove the ambient light component from the light reflected by the object in a high illuminance mode in which an illuminance of an operating environment of the three-dimensional image sensor is greater than or about equal to a reference illuminance value, and
   be deactivated in a low illuminance mode in which the illuminance of the operating environment of the three-dimensional image sensor is less than the reference illuminance value.

6. The pixel array of claim 5, wherein:
   distance information is generated for the first depth pixel by obtaining phase information from neighboring depth pixels, and by performing phase interpolation on the obtained phase information when the first ambient light cancellation circuit is deactivated in the low illuminance mode, and
   the neighboring depth pixels are disposed adjacent to the first depth pixel and operate in response to photo control signals having phases different from a phase of the first photo control signal.

7. The pixel array of claim 6, wherein the phase information is obtained from all of the second, third, and fourth depth pixels when the phase of the first photo control signal is fixed for all of a plurality of integration intervals.

8. The pixel array of claim 6, wherein the phase information is obtained from one of the second, third, and fourth depth pixels when the phase of the first photo control signal is variable for two consecutive integration intervals.

9. The pixel array of claim 2, wherein:
   a phase difference between the first photo control signal and the second photo control signal is about 90 degrees,
   a phase difference between the second photo control signal and the third photo control signal is about 90 degrees, and
   a phase difference between the third photo control signal and the fourth photo control signal is about 90 degrees.

10. The pixel array of claim 1, wherein:
    the plurality of photo control signals comprises a first photo control signal, a second photo control signal, a third photo control signal, and a fourth photo control signal, wherein the first, second, third, and fourth photo control signals have different phases, and
    the first pixel group comprises:
      a first depth pixel configured to operate in response to the first photo control signal; and
      a second depth pixel configured to operate in response to the third photo control signal.

11. The pixel array of claim 10, further comprising:
    a second pixel group, comprising:
      a second group of a plurality of depth pixels configured to operate in response to the plurality of photo control signals, and to generate second distance information of the object based on the light reflected by the object; and
      a second ambient light cancellation circuit configured to remove the ambient light component from the light reflected by the object, wherein the second ambient light cancellation circuit is shared by the second group of the plurality of depth pixels,
    wherein the second pixel group comprises:
      a third depth pixel configured to operate in response to the second photo control signal; and
      a fourth depth pixel configured to operate in response to the fourth photo control signal.

12. The pixel array of claim 11, wherein the first ambient light cancellation circuit and the second ambient light cancellation circuit are configured to:
    be activated to remove the ambient light component from the light reflected by the object in a high illuminance mode in which an illuminance of an operating environment of the three-dimensional image sensor is greater than or about equal to a reference illuminance value, and
    be deactivated in a low illuminance mode in which the illuminance of the operating environment of the three-dimensional image sensor is les than the reference illuminance value.

13. The pixel array of claim 12, wherein:
    distance information is generated for the first depth pixel by obtaining phase information from neighboring depth pixels, and by performing phase interpolation on the obtained phase information when the first ambient light cancellation circuit is deactivated in the low illuminance mode, and
    the neighboring depth pixels are disposed adjacent to the first depth pixel and operate in response to photo control signals having phases different from a phase of the first photo control signal.

14. The pixel array of claim 1, wherein the first ambient light cancellation circuit is configured to remove the ambient light component from the light reflected by the object by injecting charges having a polarity opposite to a polarity of the photo charges into the floating diffusion region, or by draining the photo charges from the floating diffusion region.

15. The pixel array of claim 1, wherein the first pixel group further comprises a drain region configured to release the photo charges, and the drain region is shared by the first group of the plurality of depth pixels.

16. A pixel array included in a three-dimensional image sensor, the pixel array comprising:
    a first pixel group, comprising:
      a first group of a plurality of depth pixels configured to operate in response to a plurality of photo control signals having different phases, and to generate first distance information of an object based on a light reflected by the object; and
      a first ambient light cancellation circuit configured to remove an ambient light component from the light reflected by the object, wherein the first ambient light cancellation circuit is shared by the first group of the plurality of depth pixels,
    wherein each depth pixel of the first group of the plurality of depth pixels comprises:
      a photoelectric conversion region configured to collect photo charges based on the light reflected by the object;
      a first floating diffusion region and a second floating diffusion region,
        wherein the first and second floating diffusion regions are connected to the first ambient light cancellation circuit, and are configured to accumulate the photo charges; and
      a first photo gate and a second photo gate,
        wherein the first and second photo gates are configured to be activated in response to two photo control signals having opposite phases from among the plurality of photo control signals,
    wherein, in a low illuminance mode in which an illuminance of an operating environment of the three-dimensional image sensor is less than a reference illuminance value, a first calculation in which distance information is generated for each depth pixel by obtaining phase information from neighboring depth pixels and by performing phase interpolation on the obtained phase information is selectively performed.

17. The pixel array of claim 16, wherein:
the plurality of photo control signals comprises a first photo control signal, a second photo control signal, a third photo control signal, and a fourth photo control signal, wherein the first, second, third, and fourth photo control signals have different phases, and
the first pixel group comprises:
   a first depth pixel configured to operate in response to the first photo control signal and the third photo control signal; and
   a second depth pixel configured to operate in response to the second photo control signal and the fourth photo control signal.

18. A pixel array included in a three-dimensional image sensor, the pixel array comprising:
a first depth pixel;
a second depth pixel, wherein the first and second depth pixels are configured to operate in response to a plurality of photo control signals having different phases, and to generate distance information of an object based on a light reflected by the object; and
an ambient light cancellation circuit configured to remove an ambient light component from the light reflected by the object, wherein the ambient light cancellation circuit is shared by the first and second depth pixels,
wherein the first depth pixel comprises a photoelectric conversion region configured to collect photo charges based on the light reflected by the object, and the second depth pixel comprises a photoelectric conversion region configured to collect the photo charges based on the light reflected by the object,
wherein each of the first and second depth pixels comprises a first floating diffusion region and a second floating diffusion region,
wherein each of the first floating diffusion region of the first depth pixel, the second floating diffusion region of the first depth pixel, the first floating diffusion region of the second depth pixel, and the second floating diffusion region of the second depth pixel is connected to the ambient light cancellation circuit shared by the first and second depth pixels, and is configured to accumulate the photo charges,
wherein the photoelectric conversion region of the first depth pixel is not shared with the second depth pixel, and the photoelectric conversion region of the second depth pixel is not shared with the first depth pixel.

19. The pixel array of claim 18, wherein:
the plurality of photo control signals comprises a first photo control signal, a second photo control signal, a third photo control signal, and a fourth photo control signal,
the first, second, third, and fourth photo control signals have different phases, and
a phase of each of the first, second, third, and fourth photo control signals is fixed for all of a plurality of integration intervals.

20. The pixel array of claim 18, wherein:
the plurality of photo control signals comprises a first photo control signal, a second photo control signal, a third photo control signal, and a fourth photo control signal,
the first, second, third, and fourth photo control signals have different phases, and
a phase of each of the first, second, third, and fourth photo control signals is variable for two consecutive integration intervals.

* * * * *